United States Patent
Yamane et al.

(10) Patent No.: US 12,077,678 B2
(45) Date of Patent: Sep. 3, 2024

(54) WATER-REPELLENT, OIL-REPELLENT MEMBER AND METHOD FOR MANUFACTURING WATER-REPELLENT, OIL-REPELLENT MEMBER

(71) Applicant: SHIN-ETSU CHEMICAL CO., LTD., Tokyo (JP)

(72) Inventors: Yuji Yamane, Annaka (JP); Ryusuke Sakoh, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 738 days.

(21) Appl. No.: 17/269,892

(22) PCT Filed: Jul. 16, 2019

(86) PCT No.: PCT/JP2019/027858
§ 371 (c)(1),
(2) Date: Feb. 19, 2021

(87) PCT Pub. No.: WO2020/039795
PCT Pub. Date: Feb. 27, 2020

(65) Prior Publication Data
US 2021/0332248 A1    Oct. 28, 2021

(30) Foreign Application Priority Data

Aug. 20, 2018   (JP) ................. 2018-153807

(51) Int. Cl.
C09D 5/00 (2006.01)
B05D 7/00 (2006.01)
C09D 171/00 (2006.01)
C09D 183/06 (2006.01)
C09D 183/14 (2006.01)

(52) U.S. Cl.
CPC ............. *C09D 5/002* (2013.01); *B05D 7/546* (2013.01); *C09D 171/00* (2013.01); *C09D 183/06* (2013.01); *C09D 183/14* (2013.01)

(58) Field of Classification Search
CPC ....................... C09D 183/00–183/16
See application file for complete search history.

(56) References Cited

U.S. PATENT DOCUMENTS

| | | | | |
|---|---|---|---|---|
| 6,001,485 A | * | 12/1999 | Kobayashi | ............. C03C 17/42 428/428 |
| 2004/0209056 A1 | | 10/2004 | Oguri | |
| 2007/0149746 A1 | | 6/2007 | Yamane et al. | |
| 2007/0197758 A1 | | 8/2007 | Yamane et al. | |
| 2008/0071042 A1 | | 3/2008 | Yamane et al. | |
| 2010/0029889 A1 | | 2/2010 | Yamane et al. | |
| 2010/0076211 A1 | | 3/2010 | Yamane et al. | |
| 2011/0098402 A1 | | 4/2011 | Yamane et al. | |
| 2014/0113145 A1 | | 4/2014 | Yamane et al. | |
| 2014/0147680 A1 | | 5/2014 | Yamane et al. | |
| 2015/0307719 A1 | | 10/2015 | Mitsuhashi et al. | |
| 2016/0040039 A1 | * | 2/2016 | Yamane | ............. C08G 65/007 524/588 |

FOREIGN PATENT DOCUMENTS

| | | |
|---|---|---|
| JP | 10-194784 A | 7/1998 |
| JP | 2002-277604 A | 9/2002 |
| JP | 2007-197425 A | 8/2007 |
| JP | 2007-297543 A | 11/2007 |
| JP | 2007-297589 A | 11/2007 |
| JP | 2008-7727 A | 1/2008 |
| JP | 2008-73915 A | 4/2008 |
| JP | 2008-88412 A | 4/2008 |
| JP | 2008-144144 A | 6/2008 |
| JP | 2010-31184 A | 2/2010 |
| JP | 2010-47516 A | 3/2010 |
| JP | 2011-116947 A | 6/2011 |
| JP | 2011-178835 A | 9/2011 |
| JP | 2013-224436 A | 10/2013 |
| JP | 2013-253228 A | 12/2013 |
| JP | 2014-84405 A | 5/2014 |

(Continued)

OTHER PUBLICATIONS

International Search Report (PCT/ISA/210) issued in PCT/JP2019/027858, dated Sep. 10, 2019.
Written Opinion of the International Searching Authority (PCT/ISA/237) issued in PCT/JP2019/027858, dated Sep. 10, 2019.

*Primary Examiner* — Prashant J Khatri
(74) *Attorney, Agent, or Firm* — Birch, Stewart, Kolasch & Birch, LLP

(57) ABSTRACT

This water-repellent, oil-repellent member is obtained via, inter alia, a method having: a step for wet-coating a substrate surface with a solution that contains a solvent and an organosilicon compound comprising multiple silanol groups in the molecule; a step for drying the solvent to form and laminate a primer layer on the substrate surface; a step for wet-coating the outer surface of the primer layer with a solution containing a hydrolyzable fluorine-containing compound and a solvent, and subsequently drying the solvent, or dry-coating the outer surface of the primer layer with a hydrolyzable fluorine-containing compound obtained by evaporating the solvent from the solution; and a step for curing the hydrolyzable fluorine-containing compound to form and laminate a water-repellent, oil-repellent layer on the outer surface of the primer layer. The water-repellent, oil-repellent member is obtained by providing, on various substrates: a primer layer of a specific thickness that contains, as a main component, an organosilicon compound having multiple silanol groups in the molecule; and, on the outer surface of the primer layer, a water-repellent, oil-repellent layer of a specific thickness that contains, as a main component, the cured hydrolyzable fluorine-containing compound. The water-repellent, oil-repellent member makes it possible for a water-repellent, oil-repellent coating exhibiting superior abrasion resistance and antistatic properties to be stably and straightforwardly formed on various substrates.

11 Claims, No Drawings

(56) References Cited

FOREIGN PATENT DOCUMENTS

| JP | 2014-105235 A | 6/2014 |
|---|---|---|
| JP | 2014-218639 A | 11/2014 |
| JP | 2017-25324 A | 2/2017 |
| WO | WO 03/005069 A1 | 1/2003 |
| WO | WO 2010/038648 A1 | 4/2010 |
| WO | WO 2013/121984 A1 | 8/2013 |
| WO | WO 2014/097388 A1 | 6/2014 |
| WO | WO 2016/190047 A1 | 12/2016 |
| WO | WO 2019/069642 A1 | 4/2019 |

\* cited by examiner

WATER-REPELLENT, OIL-REPELLENT MEMBER AND METHOD FOR MANUFACTURING WATER-REPELLENT, OIL-REPELLENT MEMBER

TECHNICAL FIELD

This invention relates to a water/oil repellent member having both antistatic and water/oil repellent properties and a method for preparing the same, and more particularly, to a water/oil repellent member comprising a substrate, a water/oil repellent layer, and a primer layer formed therebetween using an organosilicon compound having a plurality of silanol groups (silicon-bonded hydroxyl groups) in the molecule, and a method for preparing the same.

BACKGROUND ART

For the purpose of improving aesthetic appearance or visibility, the demand for the technology of rendering articles unsusceptible to staining or the technology of cleaning off stains is increasing every year. In particular, since eyeglass lenses, smartphones, wearable terminals, car navigation panels, electronic instrument housings, kitchen cabinets, and transportation vehicle bodies are susceptible to deposition of sebum and oil stains on their surface, it is desired to provide their surface with a water/oil repellent layer. However, fluorinated compounds used as the water/oil repellent agent are non-adhesive or non-bondable to various substrates because of very low surface free energy. It is thus difficult to attach the water/oil repellent agent directly to substrates. Also, since water repellent films such as fluorine base films are characteristically susceptible to static buildup, it is difficult to establish water/oil repellent surfaces having excellent antistatic properties in a simple manner.

To address the adhesion problem, as a treating agent capable of water/oil repellent treatment on surfaces of glass and other substrates, for example, JP-A 2011-116947 (Patent Document 1) discloses a fluorooxyalkylene-containing polymer composition having the following average compositional formula:

$$A\text{-}Rf^1\text{---}B \quad [\text{Chem. 1}]$$

wherein $Rf^1$ is a divalent linear fluorooxyalkylene group containing 5 to 100 repeating units: $-C_dF_{2d}O-$ wherein d is an integer of 1 to 6 and may be different among repeating units, and A and B are each independently a group selected from $Rf^2$ and the following formula:

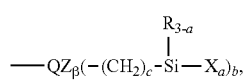

$$-QZ_\beta(-(CH_2)_c-\underset{R_{3-a}}{\overset{|}{Si}}-X_a)_b, \quad [\text{Chem. 2}]$$

$Rf^2$ is F, H or a monovalent fluorine-containing group terminated with $-CF_3$ or $-CF_2H$, Q is a divalent organic group, Z is a di- to heptavalent organopolysiloxane residue having a siloxane bond, R is $C_1$-$C_4$ alkyl or phenyl, X is a hydrolyzable group, a is 2 or 3, b is an integer of 1 to 6, c is an integer of 1 to 5, and β is an integer of 0 or 1.

Although the treatment agent of Patent Document 1 exhibits relatively good durability on substrates typically of glass where a number of silanol groups are present, it is difficult to achieve good adhesion of the agent to metals, metal oxides, and resins.

As the means for improving adhesion, Patent Document 2 (WO 2014/097388) discloses a method of depositing a $SiO_2$ layer as a primer layer by a dry process like evaporation or sputtering. It is described that a water/oil repellent layer having good durability is formed by this method. However, the range of application of this method is limited from the standpoints of productivity and production cost because treatment must be conducted in vacuum and a massive unit is necessary for coating large-size substrates.

On the other hand, Patent Document 3 (WO 2010/038648) discloses a polysilazane solution from which a primer layer is deposited by a wet process. This method utilizes the mechanism that after the polysilazane solution is coated, the polysilazane converts to silica glass through reaction with moisture. Although this method is superior to the dry method in that the vacuum process is not used, there are left problems of productivity and cost because high-temperature heating or humidifying over a long term is necessary to stabilize the adhesion of a water/oil repellent layer. Another problem arises from the aspect of heat resistance that the substrates to which the method is applicable are limited.

The member having a water/oil repellent layer formed by the above method often exhibits a higher surface resistivity than the substrate, raising the problem of static buildup. Although various antistatic agents have been proposed, surface water/oil repellent and antifouling properties are insufficient because the antistatic agents are added to the composition.

As the prior art technology relating to the present invention, the following documents are cited as well as the above-cited documents.

PRIOR ART DOCUMENTS

Patent Documents

Patent Document 1: JP-A 2011-116947
Patent Document 2: WO 2014/097388
Patent Document 3: WO 2010/038648
Patent Document 4: JP-A 2007-197425
Patent Document 5: JP-A 2007-297589
Patent Document 6: JP-A 2007-297543
Patent Document 7: JP-A 2008-088412
Patent Document 8: JP-A 2008-144144
Patent Document 9: JP-A 2010-031184
Patent Document 10: JP-A 2010-047516
Patent Document 11: JP-A 2011-178835
Patent Document 12: JP-A 2014-084405
Patent Document 13: JP-A 2014-105235
Patent Document 14: JP-A 2013-253228
Patent Document 15: JP-A 2014-218639
Patent Document 16: WO 2013/121984

SUMMARY OF INVENTION

Technical Problem

An object of the invention, which has been made under the above-mentioned circumstances, is to provide a water/oil repellent member having improved antistatic properties, and a method for preparing a water/oil repellent member involving the step of forming a water/oil repellent layer having improved antistatic properties on various substrates by a wet or dry process.

Solution to Problem

Making extensive investigations to attain the above object, the inventors have found that a water/oil repellent member in which a primer layer (first layer) composed mainly of an organosilicon compound having a plurality of silanol groups in the molecule and having a specific thickness is deposited on one of various substrates, and a water/oil repellent layer (second layer) composed mainly of a cured product of a hydrolyzable fluorinated compound and having a specific thickness is deposited on the outer surface of the primer layer is obtained by a method comprising the steps of wet coating a solution containing an organosilicon compound having a plurality of silanol groups in the molecule and a solvent on at least one surface of a substrate, drying the solvent to form and deposit a primer layer on the at least one surface of the substrate, wet coating a solution containing a hydrolyzable fluorinated compound and a solvent on the outer surface of the primer layer and then drying the solvent, or dry coating on the outer surface of the primer layer the hydrolyzable fluorinated compound obtained by evaporating the solvent from the solution, and curing the hydrolyzable fluorinated compound to form and deposit a water/oil repellent layer on the outer surface of the primer layer; that the water/oil repellent member can endow various substrates with a water/oil repellent film having improved abrasion resistant and antistatic properties (i.e., a surface resistivity of up to $1.0 \times 10^{11}$ $\Omega$/sq at the outer surface) in a consistent simple manner; and that the primer layer and the water/oil repellent layer can also be coated by the room temperature (25° C.±10° C.) process. The invention is predicated on this finding.

The invention provides a water/oil repellent member and a method for preparing the same, as defined below.

[1]
A water/oil repellent member comprising a substrate, a primer layer disposed as a first layer on at least one surface of the substrate, and a water/oil repellent layer disposed as a second layer on the outer surface of the primer layer, the primer layer being a layer which is composed mainly of an organosilicon compound having a plurality of silanol groups in the molecule and has a thickness of 30 to 500 nm, the water/oil repellent layer being a layer which is composed mainly of a cured product of a hydrolyzable fluorinated compound and has a thickness of 0.5 to 30 nm, the water/oil repellent layer having a surface resistivity of up to $1.0 \times 10^{11}$ $\Omega$/sq on its outer surface.

[2]
The water/oil repellent member of [1] wherein the organosilicon compound having a plurality of silanol groups in the molecule is a hydrolytic partial condensate of a tetraalkoxysilane.

[3]
The water/oil repellent member of [1] or [2] wherein the hydrolyzable fluorinated compound is a fluorooxyalkylene-containing hydrolyzable organosilicon compound which has at least one hydrolyzable silyl group at one or more molecular chain ends and a divalent linear perfluorooxyalkylene polymer residue composed of a linkage of multiple repeating units: —$C_jF_{2j}$O— wherein j is an integer of at least 1.

[4]
The water/oil repellent member of [3] wherein the hydrolyzable silyl group is a group selected from silyl groups containing a $C_1$-$C_{12}$ alkoxy, $C_2$-$C_{12}$ alkoxyalkoxy, $C_1$-$C_{10}$ acyloxy, $C_2$-$C_{10}$ alkenyloxy, halogen or amino moiety and silazane groups.

[5]
The water/oil repellent member of [3] or [4] wherein the divalent linear perfluorooxyalkylene polymer residue is a group having the formula:

wherein p, q, r, s, and t are each independently an integer of 0 to 200, p+q+r+s+t is 3 to 500, the repeating units in parentheses with subscripts p, q, r, s, and t may be randomly arranged, d is independently an integer of 0 to 8, and the unit with d may be straight or branched.

[6]
The water/oil repellent member of any one of [1] to [5] wherein the hydrolyzable fluorinated compound is at least one compound selected from fluorine-containing hydrolyzable organosilicon compounds having the following general formulae (1) to (5):

$$(A\text{-}Rf)_\alpha ZW_\beta \tag{1}$$

$$Rf\text{—}(ZW_\beta)_2 \tag{2}$$

$$Z'\text{—}(Rf\text{—}ZW_\beta)_\gamma \tag{3}$$

wherein Rf is independently a divalent linear perfluorooxyalkylene polymer residue having the formula:

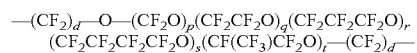

wherein p, q, r, s, and t are each independently an integer of 0 to 200, p+q+r+s+t is 3 to 500, the repeating units in parentheses with subscripts p, q, r, s, and t may be randomly arranged, d is independently an integer of 0 to 8, and the unit with d may be straight or branched, A is independently fluorine, hydrogen or a monovalent fluorine-containing group terminated with —$CF_3$, —$CF_2H$ or —$CH_2F$, Z and Z' are independently a single bond or di- to octavalent organic group which may contain nitrogen, oxygen, silicon, phosphorus or sulfur and may be fluorinated, W is independently a monovalent organic group terminated with a hydrolyzable group, $\alpha$ and $\beta$ are each independently an integer of 1 to 7, $\alpha+\beta$ is an integer of 2 to 8, and $\gamma$ is an integer of 2 to 8, $$A\text{-}Rf\text{-}Q\text{-}(Y)_\delta\text{—}B \tag{4}$$

$$Rf\text{-}(Q\text{-}(Y)_\delta\text{—}B)_2 \tag{5}$$

wherein Rf and A are as defined above, Q is independently a single bond or divalent organic group, $\delta$ is each independently an integer of 1 to 10, Y is independently a divalent organic group having a hydrolyzable group, and B is independently hydrogen, C1-C4 alkyl or halogen.

[7]
The water/oil repellent member of [6] wherein the fluorine-containing hydrolyzable organosilicon compound is selected from the following compounds:

[Chem. 3]

-continued
[Chem. 4]
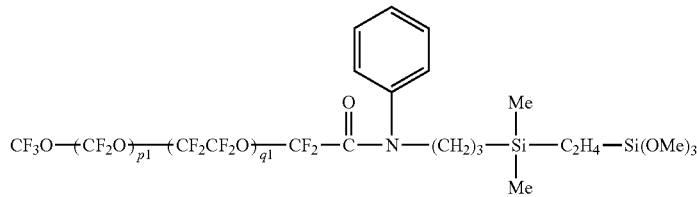
[Chem. 5]
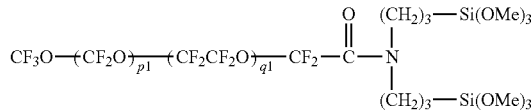
[Chem. 6]
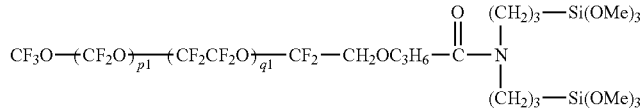
[Chem. 7]
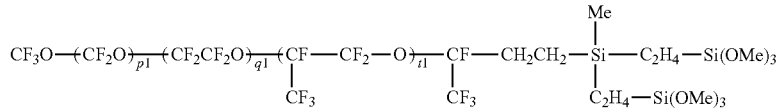
[Chem. 8]
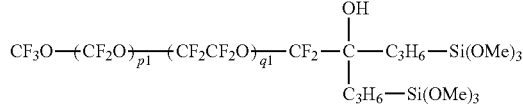
[Chem. 9]
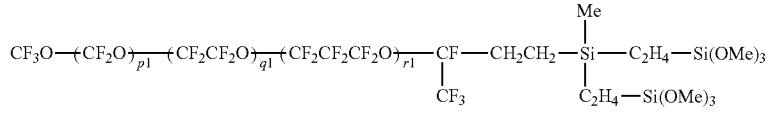
[Chem. 10]
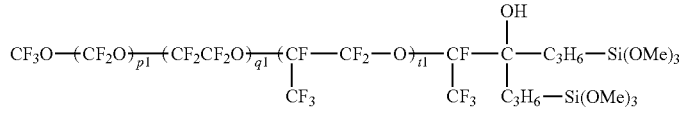
[Chem. 11]
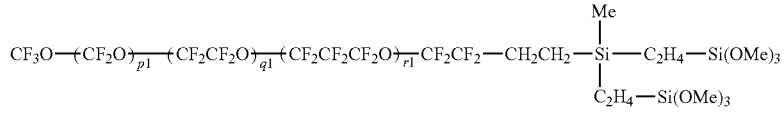
[Chem. 12]
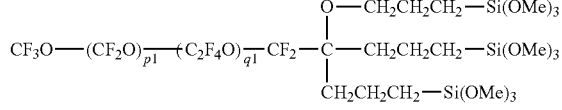
[Chem. 13]
[Chem. 14]
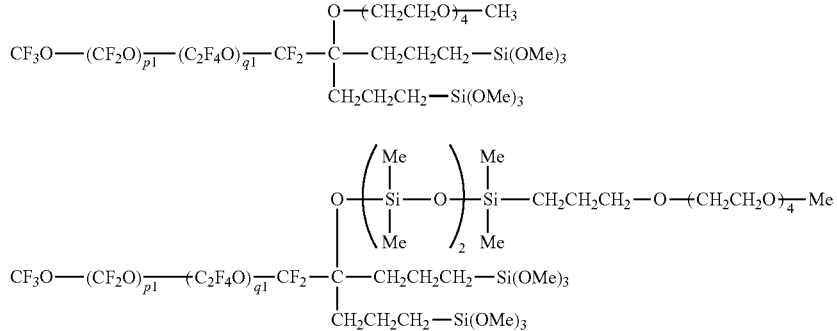

[Chem. 15]
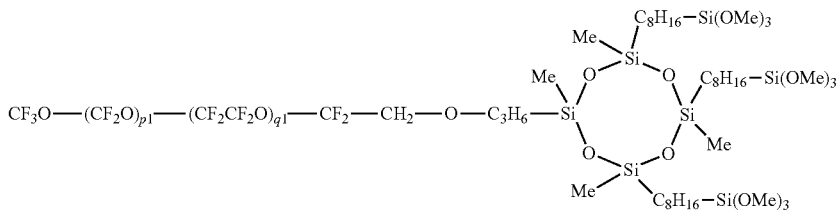
[Chem. 16]
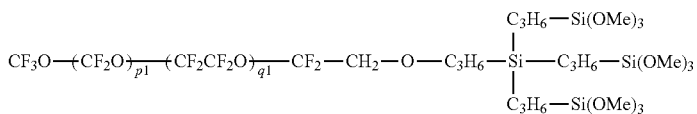
[Chem. 17]
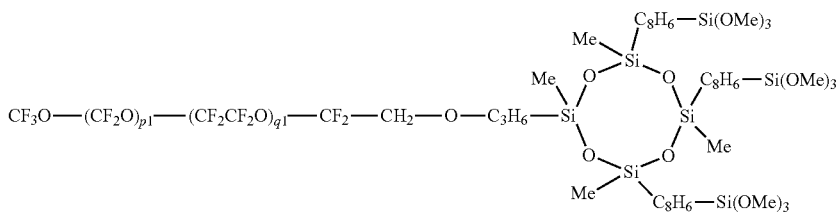
[Chem. 18]
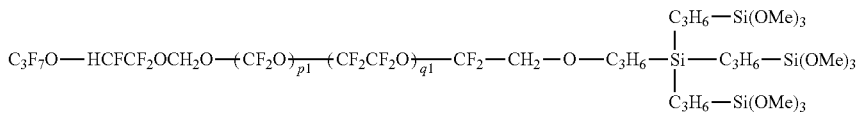
[Chem. 19]
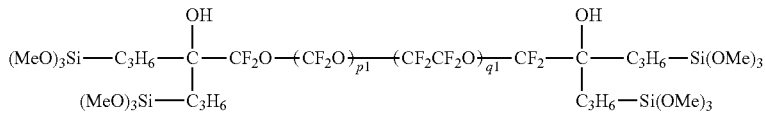
[Chem. 20]
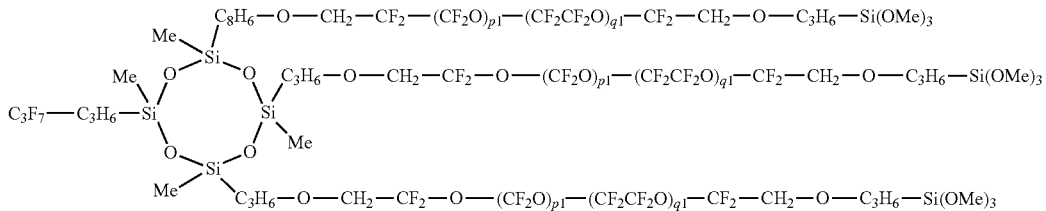
[Chem. 21]
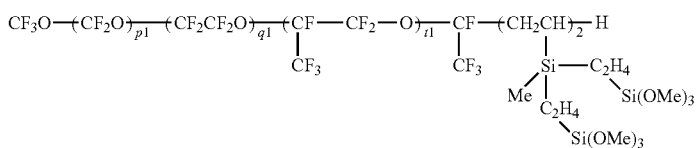
[Chem. 22]
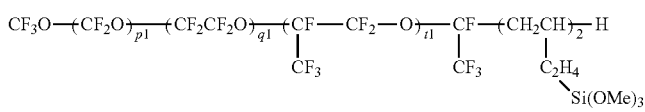
[Chem. 23]
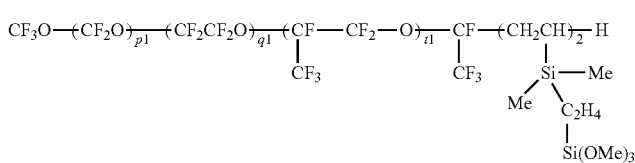

-continued

[Chem. 24]
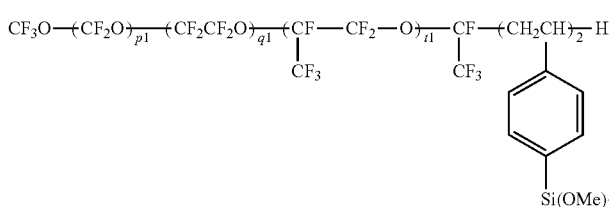

[Chem. 25]
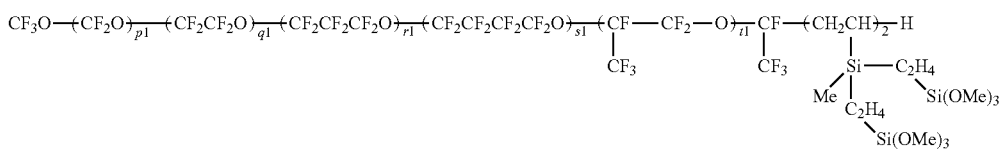

[Chem. 26]
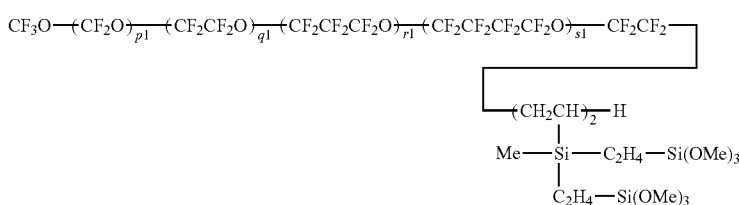

[Chem. 27]
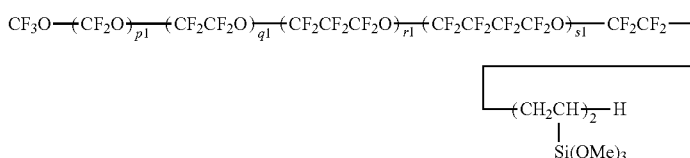

[Chem. 28]
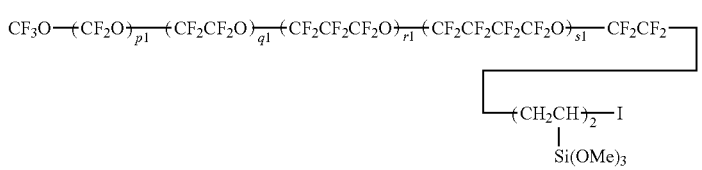

[Chem. 29]
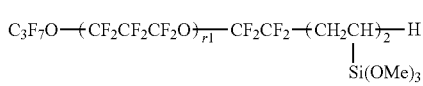

[Chem. 30]
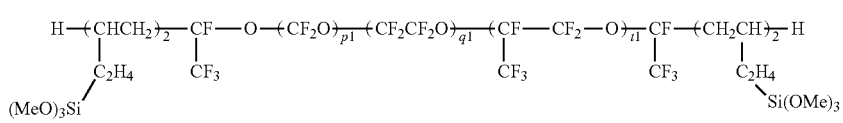

wherein Me is methyl, p1, q1, r1, s1, and t1 are each independently an integer of 1 to 200, the sum of p1, q1, r1, s1, and t1 is 3 to 500, and the repeating units in parentheses with subscripts p1, q1, r1, s1, and t1 may be randomly arranged.

[8]

The water/oil repellent member of any one of [1] to [7] wherein the substrate is a resin, ceramic, quartz, glass, sapphire or diamond.

[9]

A method for preparing the water/oil repellent member of any one of [1] to [8], comprising the steps of wet coating a solution containing an organosilicon compound having a plurality of silanol groups in the molecule and a solvent on at least one surface of a substrate, drying the solvent to form and deposit a primer layer on the at least one surface of the substrate, wet coating a solution containing a hydrolyzable fluorinated compound and a solvent on the outer surface of the primer layer and then drying the solvent, or dry coating the hydrolyzable fluorinated compound obtained by evaporating the solvent from the solution, and curing the hydrolyzable fluorinated compound to form and deposit a water/oil repellent layer on the outer surface of the primer layer.

As used herein, the term "linear perfluorooxyalkylene polymer residue" means that divalent fluorooxyalkylene repeating units of which the backbone of perfluorooxyalkylene structure is constructed are linearly linked. Each divalent fluorooxyalkylene unit may be a fluorooxyalkylene unit of branched structure such as —[$CF_2CF(CF_3)O$]—.

Advantageous Effects of Invention

The water/oil repellent member of the invention has both antistatic properties and water/oil repellent surface. The method for preparing the water/oil repellent member enables to form the relevant layer by the wet process (e.g., brush coating, spin coating, spray coating, gravure coating, die coating, bar coating, or slit coating) without resorting essentially to the vacuum process or high-temperature heating process. The water/oil repellent member and the method are useful in a variety of applications, specifically applications which need antistatic and antifouling properties. The water/oil repellent member is particularly useful for products that lose their function due to static buildup, products that should avoid a loss of visibility and marring due to electrostatic dust deposition, and products that lose visibility and appearance due to adhesion of fingerprint, oil or water, for example, electronic instrument housings, wearable terminals, eyeglass lenses, touch panel displays, protective film, protective glass, and quartz glass used for semiconductor device fabrication.

DESCRIPTION OF EMBODIMENTS

Now the invention is described in detail.

The invention provides a water/oil repellent member comprising a substrate, a primer layer disposed as a first layer on at least one surface of the substrate, and a water/oil repellent layer disposed as a second layer on the outer surface of the primer layer, the primer layer being a layer which is composed mainly of an organosilicon compound having a plurality of silanol groups in the molecule and has a thickness of 30 to 500 nm, the water/oil repellent layer being a layer which is composed mainly of a cured product of a hydrolyzable fluorinated compound and has a thickness of 0.5 to 30 nm, the water/oil repellent layer having a surface resistivity of up to $1.0 \times 10^{11}$ Ω/sq on its outer surface.

According to the invention, for example, a method comprising the steps of wet coating a solution containing an organosilicon compound having a plurality of silanol groups in the molecule and a solvent on a surface (at least one surface) of any one of various substrates, drying the solvent to form and deposit a primer layer (first layer) on the at least one surface of the substrate, wet coating a solution containing a hydrolyzable fluorinated compound and a solvent (i.e., water/oil repellent agent) onto the outer surface of the primer layer and then drying the solvent, or dry coating the hydrolyzable fluorinated compound obtained by evaporating the solvent from the solution (i.e., water/oil repellent agent), and curing the hydrolyzable fluorinated compound to form and deposit a water/oil repellent layer (second layer) on the outer surface of the primer layer, is used to form a water/oil repellent member comprising any one of various substrates, a primer layer (first layer) of 30 to 500 nm thick which is composed mainly of an organosilicon compound having a plurality of silanol groups in the molecule and disposed on the surface of the substrate, and a water/oil repellent layer (second layer) of 0.5 to 30 nm thick which is composed mainly of a cured product of a hydrolyzable fluorinated compound and disposed on the surface of the primer layer, the water/oil repellent layer having a surface resistivity of up to $1.0 \times 10^{11}$ Ω/sq on its outer surface.

The substrate which can be used herein is not particularly limited and is preferably selected from resins, ceramics, quartz, glass, sapphire, and diamond.

Suitable substrate-forming resins include thermoplastic resins and thermosetting resins. Specifically stated, the thermoplastic resins include celluloid, cellulose acetate, cellulose propionate, cellulose butyrate, aliphatic polyamides such as nylon 6, nylon 66, and nylon 12, aromatic polyamides, ABS resins, AS resins, polystyrene, polyolefins such as polyethylene (low or high density) and polypropylene, polyvinyl chloride, polyvinylidene chloride, ethylene-vinyl acetate copolymers, polyvinyl alcohol, polyacetal, polycarbonate, saturated polyesters such as polyethylene terephthalate and polybutylene terephthalate, aromatic polyesters, polyether ketone, polyether ether ketone, polysulfone, polyethersulfone, polyetherimide, polyarylate, polymethylpentene, ionomer, liquid crystal polymers, polyimide, polyamideimide, fluororesins, polyphenylenesulfide, (modified) polyphenyleneoxide, and thermoplastic polyurethanes, and the thermosetting resins include epoxy resins, unsaturated polyesters, thermosetting polyurethanes, polyimide, polymers of di(ethylene glycol) bis(allyl carbonate) (commonly referred to as CR-39), (co)polymers of (halogenated) bisphenol A with di(meth)acrylate, (co)polymers of (halogenated) bisphenol A with urethane-modified di(meth)acrylate, and copolymers of diacrylate compounds or vinylbenzyl alcohol with unsaturated thiol compounds.

Examples of the ceramic include, but are not limited to, alumina, zirconia, silicon nitride, aluminum nitride, silicon carbide, barium titanate, zircon, mullite, steatite, forsterite, lead zirconate titanate, ferrite, and cordierite. Examples of the glass include, but are not limited to, soda glass, aluminosilicate glass, borosilicate glass, crown glass, Tempax, Pyrex, Neoceram, and quartz glass. Chemically strengthened glass and physically strengthened glass are also acceptable.

The primer layer (first layer) which is formed and deposited on at least one surface of the substrate is composed mainly of an organosilicon compound having a plurality of silanol groups in the molecule, preferably contains at least 50% by weight of the organosilicon compound, and has a thickness of 30 to 500 nm. The primer layer may be formed (or deposited), for example, by wet coating a solution containing an organosilicon compound having a plurality of silanol groups in the molecule and a solvent onto the surface of any one of various substrates and then drying the solution to remove the solvent.

The organosilicon compound having a plurality of silanol groups in the molecule preferably has at least 2, more preferably at least 3, and even more preferably at least 4 silanol groups per molecule. If the number of silanol groups in the molecule is too small, the outer surface of the water/oil repellent layer (second layer) deposited on the outer surface of the primer layer (first layer) may not have a low surface resistivity. The organosilicon compound having a plurality of silanol groups in the molecule preferably has a silanol content of 0.002 to 0.042 mol/g, more preferably 0.004 to 0.035 mol/g, and most preferably 0.005 to 0.030 mol/g.

The organosilicon compound having a plurality of silanol groups in the molecule may be obtained by hydrolysis and partial condensation of an organosilicon compound having a plurality of hydrolyzable groups such as alkoxy groups (e.g., methoxy and ethoxy) and halogen atoms (e.g., chlorine) in the molecule.

Examples of the organosilicon compound having a plurality of hydrolyzable groups in the molecule include methyltrimethoxysilane, dimethyldimethoxysilane, phenyltrimethoxysilane, dimethoxydiphenylsilane, tetramethoxysilane, tetraethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, 1,6-bis(trimethoxysilyl)hexane, trifluoropropyltrimethoxysilane, vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, tris(trimethoxysilylpropyl)isocyanurate, trichlorosilane, and dichlorosilane. These compounds may be used in admixture of two or more.

The organosilicon compound having a plurality of silanol groups in the molecule which is preferably used herein is obtained from hydrolysis of an organosilicon compound having a plurality of hydrolyzable groups in the molecule, typically the aforementioned organosilane, followed by partial dehydration condensation of the hydrolyzed compound to a high-molecular-weight compound (i.e., partial condensate). As used herein, the term "partial condensate" means an organopolysiloxane compound having a plurality of residual silanol groups in the molecule which is obtained from hydrolysis of an organosilicon compound having a plurality of hydrolyzable groups in the molecule, typically the aforementioned organosilane, into an organosilane having a plurality of silanol groups (i.e., silicon-bonded hydroxyl groups) in the molecule, followed by partial dehydration condensation of the organosilane having a plurality of silanol groups.

The hydrolytic partial condensate of the organosilicon compound having a plurality of hydrolyzable groups in the molecule, that is, organosilicon compound having a plurality of silanol groups in the molecule preferably has a weight average molecular weight (Mw) of 300 to 100,000, more preferably 5,000 to 50,000. As used herein, the Mw is measured, for example, by gel permeation chromatography (GPC) versus polystyrene standards using toluene as developing solvent (the same holds true, hereinafter).

Preferred as the organosilicon compound having a plurality of silanol groups in the molecule are hydrolytic partial condensates of tetraorganosilanes such as tetramethoxysilane and tetraethoxysilane.

The organosilicon compound having a plurality of silanol groups in the molecule is desirably diluted with a solvent. Preferred examples of the solvent for dissolving the organosilicon compound having a plurality of silanol groups in the molecule include alcohols such as methanol, ethanol, isopropanol, and butanol and ethers such as propylene glycol monomethyl ether and polyethylene glycol monopropyl ether. The solvent is not particularly limited and may be selected in view of substrate wetting and boiling point. The solution containing the organosilicon compound having a plurality of silanol groups in the molecule and a solvent should preferably contain the organosilicon compound in a concentration of 0.01 to 10% by weight, more preferably 0.6 to 4% by weight. If the concentration is too low, more portions may be left uncoated. If the concentration is too high, secondary agglomeration can take place between silanol groups.

The solution containing the organosilicon compound having a plurality of silanol groups in the molecule and a solvent may optionally contain such components as UV absorbers, photostabilizers, antioxidants, leveling agents, defoamers, pigments, dyes, dispersants, antistatic agents, anti-fogging agents, and surfactants. The optional components are preferably added in such amounts that the organosilicon compound having a plurality of silanol groups in the molecule accounts for at least 50% by weight (i.e., 50 to 100% by weight), more preferably 80 to 100% by weight, that is, the optional components account for up to 50% by weight (i.e., 0 to 50% by weight), more preferably 0 to 20% by weight, of the primer layer which is formed by removing the solvent.

A primer layer composed mainly of the organosilicon compound having a plurality of silanol groups in the molecule may be formed by applying the solution containing the organosilicon compound having a plurality of silanol groups in the molecule and a solvent onto a substrate surface by a wet coating process, specifically dipping, brush coating, spin coating, spray coating, gravure coating, die coating, bar coating, slit coating or flow coating and then drying off the solvent. The solvent may be dried at room temperature (25° C.±10° C.) for about 1 to about 24 hours, or by heating at a temperature in the range which does not affect the substrate, for example, at 40 to 150° C. for about 30 seconds to about 24 hours.

The primer layer (first layer) which is formed and deposited on at least one surface of a substrate typically has a thickness of 30 to 500 nm, preferably 30 to 400 nm, and more preferably 30 to 250 nm although the thickness is selected as appropriate depending on a particular substrate. As used herein, the film thickness may be measured by any well-known methods such as spectroscopic ellipsometry, X-ray reflectometry, and X-ray fluorescence film thickness measurement (the same holds true, hereinafter).

Next, the water/oil repellent layer (second layer) which is formed and deposited on the outer surface of the primer layer is a layer composed mainly of a cured product of a hydrolyzable fluorinated compound and having a thickness of 0.5 to 30 nm.

The water/oil repellent layer may be formed and deposited, for example, by coating a solution containing a hydrolyzable fluorinated compound and a solvent (i.e., water/oil repellent agent) onto the outer surface of the pre-formed primer layer (first layer) and then curing the coating.

Examples of the hydrolyzable fluorinated compound used herein include the hydrolyzable fluorinated organosilicon compounds described in JP-A 2007-197425 (US 20070149746 A1), JP-A 2007-297589 (US 20070197758 A1), JP-A 2007-297543, JP-A 2008-088412 (US 20080071042 A1), JP-A 2008-144144, JP-A 2010-031184 (US 20100029889 A1), JP-A 2010-047516 (US 20100076211 A1), JP-A 2011-116947 (US 20110098402 A1), JP-A 2011-178835, JP-A 2014-084405 (US 20140113145 A1), JP-A 2014-105235 (US 20140147680 A1), JP-A 2013-253228, JP-A 2014-218639 (US 20150307719 A1), and WO 2013/121984 (US 20140302332 A1) (i.e., Patent Documents 1, 4 to 16).

The hydrolyzable fluorinated compound is described in further detail.

The hydrolyzable fluorinated compound used herein is preferably a hydrolyzable fluorinated compound having at least one, preferably 1 to 6, more preferably 2 to 4 hydrolyzable silyl groups each at one or more, preferably 1 to 14, more preferably 1 to 7 molecular chain ends (e.g., at least one, preferably 2 to 60, more preferably 3 to 30 hydrolyzable silyl groups per molecule). The compound is more preferably an organosilicon compound having a hydrolyzable silyl group and fluorine in the molecule, the hydrolyzable silyl group being selected from silyl groups containing a $C_1$-$C_{12}$, especially $C_1$-$C_{10}$ alkoxy moiety such as methoxy, ethoxy, propoxy or butoxy, $C_2$-$C_{12}$, especially $C_2$-$C_{10}$ alkoxyalkoxy moiety such as methoxymethoxy or methoxyethoxy, $C_1$-$C_{10}$ acyloxy moiety such as acetoxy, $C_2$-$C_{10}$ alkenyloxy moiety such as isopropenoxy, halogen moiety such as chloro, bromo or iodo, or amino moiety and silazane groups.

The hydrolyzable fluorinated compound is preferably a compound having a fluorooxyalkylene group (i.e., mono- or divalent perfluoropolyether residue) in the molecule. The fluorooxyalkylene group refers to a compound of (poly)fluorooxyalkylene structure (i.e., divalent linear perfluorooxyalkylene polymer residue) which is composed of a linkage of multiple repeating units: —$C_jF_{2j}O$— wherein j is an integer of at least 1, preferably 1 to 6, and more preferably 1 to 4. Especially, the structure may have 3 to 500, preferably 15 to 200, more preferably 20 to 100, and even more preferably 25 to 80 repeating units.

The repeating units: —C$_j$F$_{2j}$O— may be straight or branched. Examples include the following units while repeating units of more than one type may be bonded.

—CF$_2$O—

—CF$_2$CF$_2$O—

—CF$_2$CF$_2$CF$_2$O—

—CF(CF$_3$)CF$_2$O—

—CF$_2$CF$_2$CF$_2$CF$_2$O—

—CF$_2$CF$_2$CF$_2$CF$_2$CF$_2$O—

—C(CF$_3$)$_2$O—

Most preferably, the (poly)fluorooxyalkylene structure (i.e., divalent linear perfluorooxyalkylene polymer residue) is —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$— wherein p, q, r, s, and t are each independently an integer of 0 to 200, preferably p is an integer of 5 to 100, q is an integer of 5 to 100, r is an integer of 0 to 100, s is an integer of 0 to 50, and t is an integer of 0 to 100, p+q+r+s+t is an integer of 3 to 500, preferably an integer of 10 to 105, the repeating units in parentheses with subscripts p, q, r, s, and t may be randomly arranged, d is independently an integer of 0 to 8, preferably an integer of 0 to 5, and more preferably an integer of 0 to 2, and the unit with d may be straight or branched. Specific examples are shown by the following structures.

[Chem. 31]

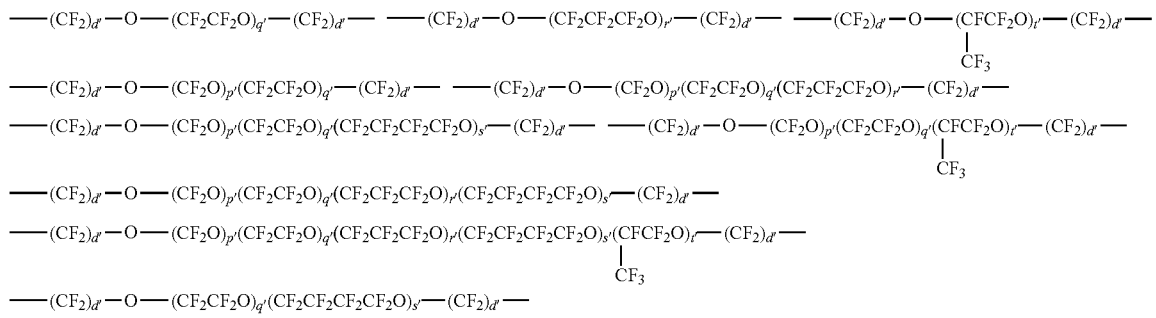

Herein p', q', r', s', and t' are each independently an integer of 1 to 200, the sum of p', q', r', s', and t' is 3 to 500, the repeating units in parentheses with p', q', r', s', and t' may be randomly arranged, d' is independently an integer of 0 to 5, and the unit with d' may be straight or branched.

More preferably the hydrolyzable fluorinated compound used herein is a fluorine-containing hydrolyzable organosilicon compound (i.e., fluorinated hydrolyzable organosilicon compound) having any one of the following general formulae (1) to (5). These compounds may be used alone or in admixture of two or more.

(A-Rf)$_\alpha$ZW$_\beta$     (1)

Rf—(ZW$_\beta$)$_2$     (2)

Z'—(Rf—ZW$_\beta$)$_\gamma$     (3)

A-Rf-Q-(Y)$_\delta$—B     (4)

Rf-(Q-(Y)$_\delta$—B)$_2$     (5)

In formulae (1) to (5), Rf is independently a divalent linear perfluorooxyalkylene polymer residue having the formula:

—(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$— wherein p, q, r, s, and t are each independently an integer of 0 to 200, p+q+r+s+t is 3 to 500, the repeating units in parentheses with p, q, r, s, and t may be randomly arranged, d is independently an integer of 0 to 8, and the unit with d may be straight or branched. "A" is independently fluorine, hydrogen or a monovalent fluorine-containing group terminated with —CF$_3$, —CF$_2$H or —CH$_2$F, Z and Z' are independently a single bond or a di- to octavalent organic group which may contain nitrogen, oxygen, silicon, phosphorus or sulfur and which may be fluorinated, W is independently a monovalent organic group terminated with a hydrolyzable group, α and β are each independently an integer of 1 to 7, a is preferably an integer of 1 to 3, more preferably 1, is preferably an integer of 1 to 3, α+β is an integer of 2 to 8, preferably an integer of 2 to 4, and γ is an integer of 2 to 8, preferably 2 or 3.

Q is independently a single bond or divalent organic group, δ is each independently an integer of 1 to 10, Y is independently a divalent organic group having a hydrolyzable group, and B is independently hydrogen, C$_1$-C$_4$ alkyl or halogen.

In formulae (1) to (5), Rf is the above-described (poly)fluorooxyalkylene structure (i.e., divalent linear perfluorooxyalkylene polymer residue):

—(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, examples of which are as illustrated above.

In formulae (1) and (4), "A" is independently fluorine, hydrogen or a monovalent fluorine-containing group terminated with —CF$_3$, —CF$_2$H or —CH$_2$F. Suitable examples of the monovalent fluorine-containing group terminated with —CF$_3$, —CF$_2$H or —CH$_2$F include —CF$_3$, —CF$_2$CF$_3$, —CF$_2$CF$_2$CF$_3$, —CH$_2$CF(CF$_3$)—OC$_3$F$_7$, and —CH$_2$OCF$_2$CFH—OC$_3$F$_7$. Inter alia, —CF$_3$, —CF$_2$CF$_3$, —CF$_2$CF$_2$CF$_3$ and —CH$_2$OCF$_2$CFH—OC$_3$F$_7$ are preferred as "A".

In formulae (1) to (3), Z and Z' are independently a single bond or a di- to octavalent organic group which may contain nitrogen, oxygen, silicon, phosphorus or sulfur and which may be fluorinated. The organic group may be represented by $(L)_e$-M wherein e is an integer of 1 to 7, preferably an integer of 1 to 3.

Herein L is a single bond, oxygen, sulfur or a divalent organic group. In formulae (1) to (3), L in Z is a linking group between Rf group and M (or W) group and L in Z' is a linking group between M (or Rf) group and Rf group. The divalent organic group is preferably a $C_2$-$C_{12}$ substituted or unsubstituted divalent organic group which may contain one or more moieties selected from the group consisting of amide bond, ether bond, carbonyl bond, ester bond, diorganosilylene moieties (e.g., dimethylsilylene), and —Si[OH][(CH$_2$)$_f$Si(CH$_3$)$_3$]— wherein f is an integer of 2 to 4, more preferably a $C_2$-$C_{12}$ substituted or unsubstituted divalent hydrocarbon group which may contain any of the aforementioned moieties.

Examples of the $C_2$-$C_{12}$ substituted or unsubstituted divalent hydrocarbon group include alkylene groups such as ethylene, propylene (trimethylene or methylethylene), butylene (tetramethylene or methylpropylene), hexamethylene, and octamethylene, arylene groups such as phenylene, and combinations of two or more of the foregoing such as alkylene-arylene groups. The substituted forms of the foregoing groups in which some or all of the carbon-bonded hydrogen atoms are substituted by halogen atoms such as fluorine and iodine are also acceptable. Of these, $C_2$-$C_4$ substituted or unsubstituted alkylene groups and phenylene are preferred.

Examples of the divalent organic group L include groups of the following structure or combinations of two or more such groups.

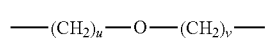
[Chem. 32]

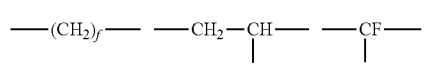
[Chem. 33]

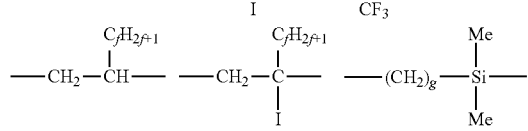

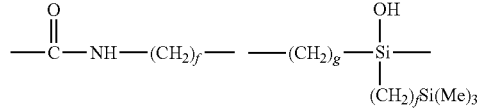

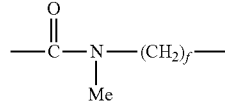

[Chem. 34]

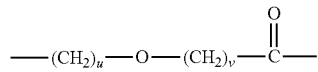

[Chem. 35]

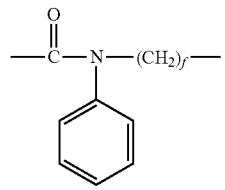

[Chem. 36]

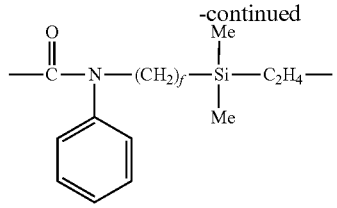

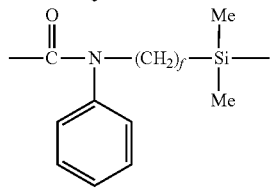

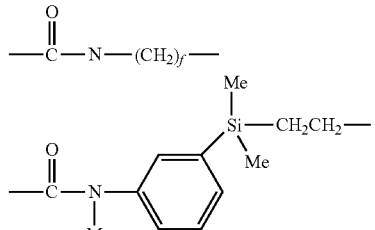

[Chem. 37]

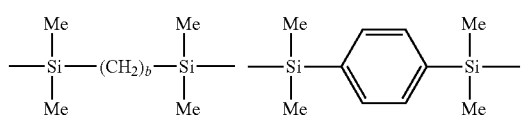

Herein f is an integer of 2 to 4, b is an integer of 2 to 6, preferably an integer of 2 to 4, u and v each are an integer of 1 to 4, g is an integer of 2 to 4, and Me is methyl.

Also, M is a single bond, nitrogen, silicon, carbon, phosphorus, or a group containing such atom, or a di- to octavalent ((e+1)-valent) organic group. Specifically, M is a single bond, a group selected from divalent group: —R$^1{}_2$C—, divalent group: —R$^3{}_2$Si—, divalent group: —NR$^4$—, trivalent group: —N=, trivalent group: —P=, trivalent group: —PO=, trivalent group: —R'C=, trivalent group: —R$^3$Si=, tetravalent group: —C≡, tetravalent group: —O—C≡, and tetravalent group: —Si≡, or a di- to octavalent siloxane residue. In formulae (1) to (3), each M in Z is a linking group between L (or Rf) group and W group and M in Z' is a group to link with Rf group via L or a group to link Rf groups together.

Herein R$^1$ is each independently an alkyl group of preferably 1 to 3 carbon atoms, hydroxyl, group having repeating units of $C_1$-$C_3$ oxyalkylene which may be separated by a diorganosiloxane structure of 2 to 51 silicon atoms, or silyl ether group: R$^2{}_3$SiO—. R$^2$ is each independently hydrogen, an alkyl group of preferably 1 to 3 carbon atoms, aryl group such as phenyl, or $C_1$-$C_3$ alkoxy group. R$^3$ is each independently an alkyl group of preferably 1 to 3 carbon atoms, $C_2$ or $C_3$ alkenyl group, $C_1$-$C_3$ alkoxy group or chloro. R$^4$ is a $C_1$-$C_3$ alkyl group or $C_6$-$C_{10}$ aryl group such as phenyl. When M is a siloxane residue, it preferably has a straight, branched or cyclic organopolysiloxane structure of 2 to 51 silicon atoms, preferably 2 to 13 silicon atoms, more preferably 2 to 11 silicon atoms, and even more preferably 2 to 5 silicon atoms. The organopolysiloxane preferably has a $C_1$-$C_8$, more preferably $C_1$-$C_4$ unsubstituted or fluorinated alkyl group such as methyl, ethyl, propyl, butyl or $C_3F_7$—$C_3H_6$— or phenyl. The organopolysiloxane may also contain a silalkylene structure in which two silicon atoms are linked by an alkylene group, that is, Si—(CH$_2$)$_n$—Si wherein n is an integer of 2 to 6, preferably an integer of 2 to 4.

The following are exemplary of M defined above.

[Chem. 38]

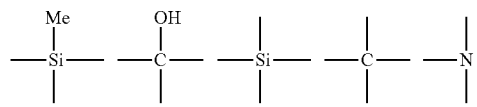

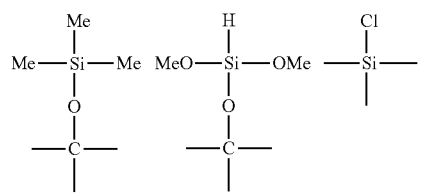

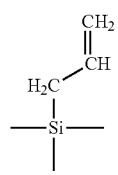

[Chem. 39]

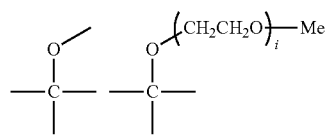

[Chem. 40]

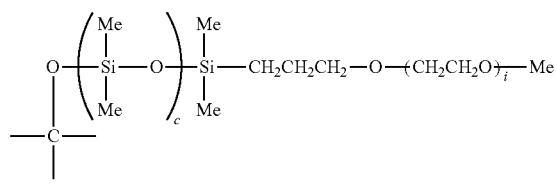

[Chem. 41]

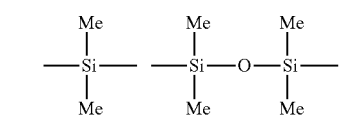

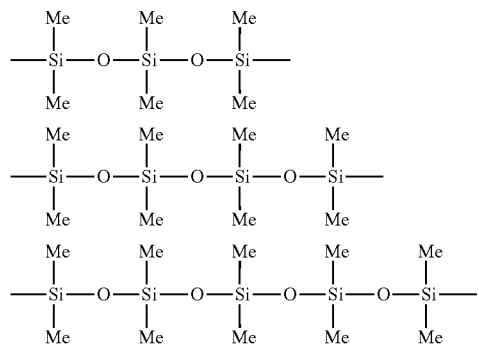

[Chem. 42]

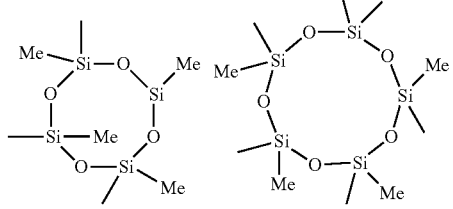

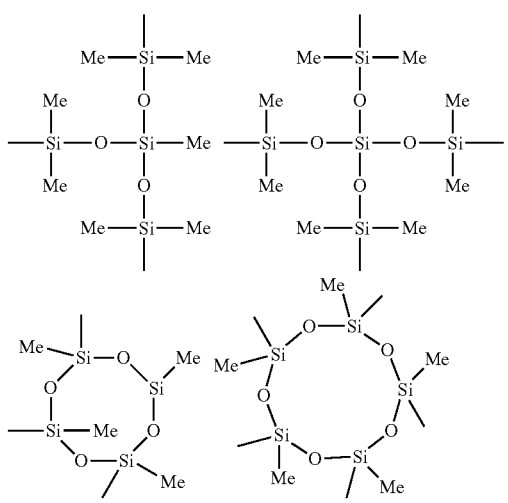

[Chem. 43]

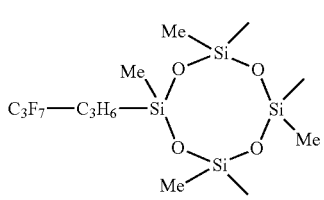

[Chem. 44]

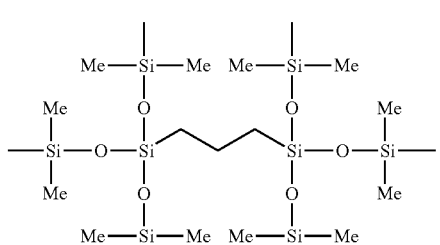

Herein i is an integer of 1 to 20, c is an integer of 1 to 50, and Me is methyl.

In formulae (1) to (3), W is independently a monovalent organic group terminated with a hydrolyzable group, preferably represented by the following formula.

[Chem. 45]

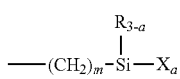

Herein R is C$_1$-C$_4$ alkyl or phenyl, X is independently a hydrolyzable group, a is 2 or 3, and m is an integer of 0 to 10.

In the above formula, examples of the hydrolyzable group X include C$_1$-C$_{12}$, especially C$_1$-C$_{10}$ alkoxy groups such as methoxy, ethoxy, propoxy, and butoxy; C$_2$-C$_{12}$, especially C$_2$-C$_{10}$ alkoxyalkoxy groups such as methoxymethoxy and methoxyethoxy; C$_1$-C$_{10}$ acyloxy groups such as acetoxy; C$_2$-C$_{10}$ alkenyloxy groups such as isopropenoxy; halogen groups such as chloro, bromo, and iodo; and amino groups. Of these, methoxy and ethoxy are preferred.

R is C$_1$-C$_4$ alkyl such as methyl or ethyl, or phenyl, with methyl being preferred.

The subscript "a" is 2 or 3. From the aspects of reactivity and substrate adhesion, "a" is preferably equal to 3. The subscript m is an integer of 0 to 10, preferably an integer of 2 to 8, and more preferably 2 or 3.

In formulae (1) to (3), examples of the structures: $(-)_\alpha ZW_\beta$ and $-ZW_\beta$ are given below.

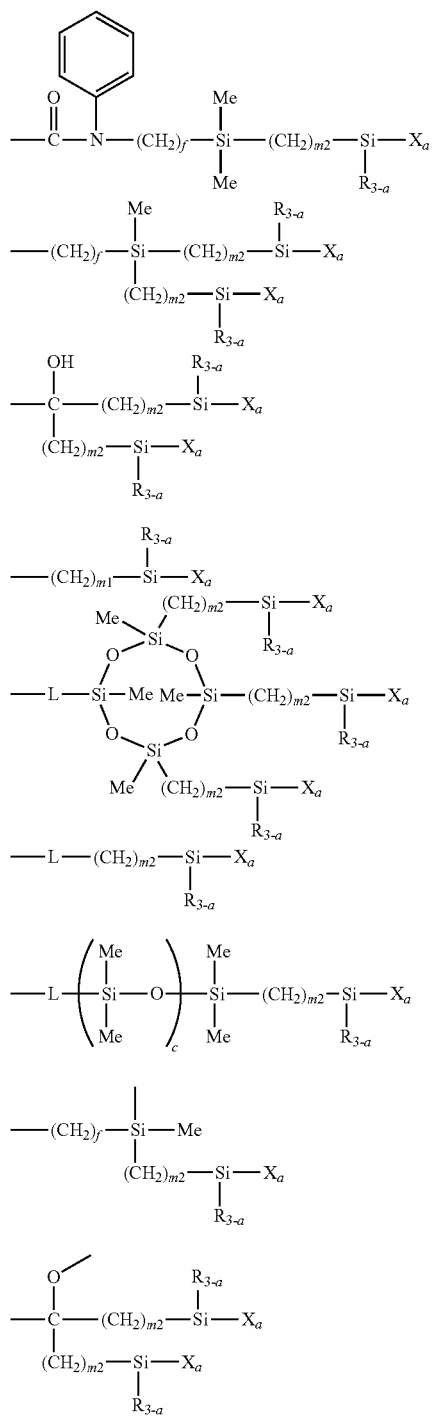

[Chem. 46]

[Chem. 47]

[Chem. 48]

[Chem. 49]

[Chem. 50]

Herein L, R, X, f, c, and a are as defined above, m1 is an integer of 0 to 10, preferably an integer of 2 to 8, m2 is an integer of 1 to 10, preferably an integer of 2 to 8, and Me is methyl.

In formulae (4) and (5), Q is independently a single bond or divalent organic group, that is a linking group between Rf group and Y group. The divalent organic group Q is preferably a $C_2$-$C_{12}$ substituted or unsubstituted divalent organic group which may contain at least one structure selected from the group consisting of amide bond, ether bond, ester bond, diorganosilylene groups (e.g., dimethylsilylene), and —Si[OH][$(CH_2)_f Si(CH_3)_3$]— wherein f is an integer of 2 to 4, more preferably a $C_2$-$C_{12}$ substituted or unsubstituted divalent hydrocarbon group which may contain the aforementioned structure.

Examples of the $C_2$-$C_{12}$ substituted or unsubstituted divalent hydrocarbon group are as exemplified above for the $C_2$-$C_{12}$ substituted or unsubstituted divalent hydrocarbon group L.

Examples of the divalent organic group Q include groups having the following structure.

[Chem. 51]

[Chem. 52]

[Chem. 53]

-continued

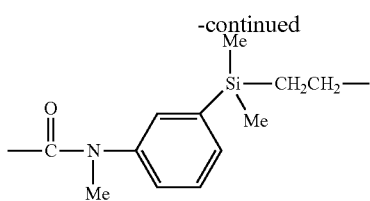

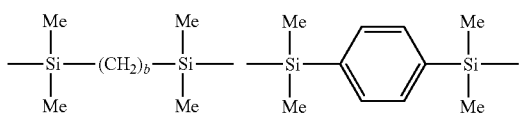

Herein f is an integer of 2 to 4, b is an integer of 2 to 6, preferably an integer of 2 to 4, u and v are an integer of 1 to 4, g is an integer of 2 to 4, and Me is methyl.

In formulae (4) and (5), Y is each independently a divalent organic group having a hydrolyzable group, preferably a group of the following structure.

[Chem. 55]

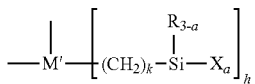

Herein R, X, and a are as defined above, k is an integer of 0 to 10, preferably an integer of 1 to 10, more preferably an integer of 2 to 8, h is an integer of 1 to 6, preferably 1 or 2. M' is a substituted or unsubstituted tri- to octavalent, preferably tri- or tetravalent hydrocarbon group, in which some or all carbon atoms may be replaced by silicon atoms and some or all of the carbon-bonded hydrogen atoms may be substituted by halogen atoms such as fluorine.

M' is preferably a group having the following structure.

[Chem. 56]

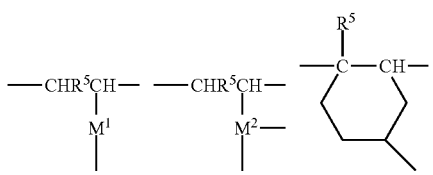

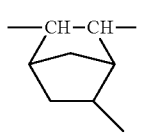

Herein $M^1$ is a single bond, $C_1$-$C_6$ substituted or unsubstituted divalent hydrocarbon group or diorganosilylene group such as dimethylsilylene. $M^2$ is a trivalent group: —$R^1$C= or trivalent group: —$R^3$Si=. $R^1$ and $R^3$ are as defined above. $R^5$ is hydrogen or a monovalent hydrocarbon group, typically $C_1$-$C_6$ alkyl group such as methyl, ethyl or propyl.

Exemplary of $M^1$ are a single bond, phenylene, dimethylsilylene and tetrafluoroethylene. The following is typical of $M^2$.

[Chem. 57]

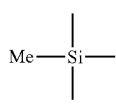

Herein Me is methyl.

Examples of Y include the following groups.

[Chem. 58]

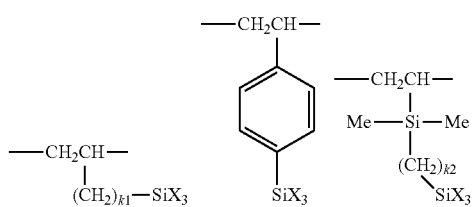

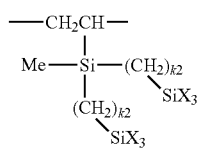

[Chem. 59]

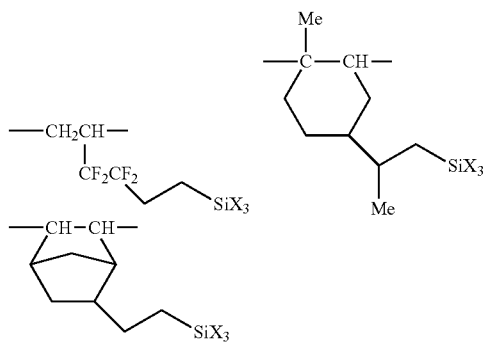

Herein X is as defined above, k1 is an integer of 0 to 10, preferably an integer of 1 to 8, k2 is an integer of 2 to 10, preferably an integer of 2 to 8, and Me is methyl.

In formulae (4) and (5), δ is each independently an integer of 1 to 10, preferably an integer of 1 to 4.

B is each independently selected from hydrogen, $C_1$-$C_4$ alkyl groups such as methyl, ethyl, propyl and butyl, and halogen atoms such as fluorine, chlorine, bromine and iodine.

Examples of the fluorine-containing hydrolyzable organosilicon compounds (fluorinated hydrolyzable organosilicon compounds) having formulae (1) to (5) include the structures shown below.

[Chem. 60]

$$CF_3O\text{---}(CF_2CF_2O)_{\overline{q1}}(CF_2CF_2CF_2CF_2O)_{\overline{s1}}CF_2CF_2CF_2\text{---}C_2H_4\text{---}Si(OMe)_3$$

-continued
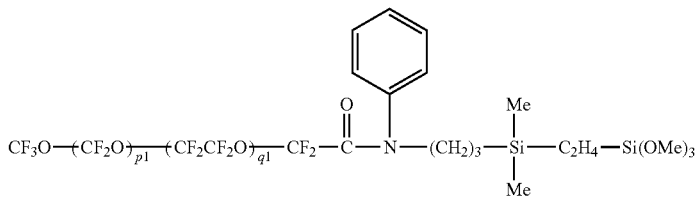
[Chem. 61]
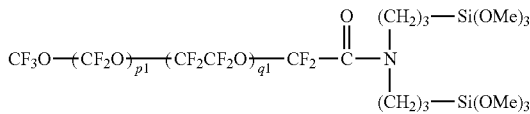
[Chem. 62]
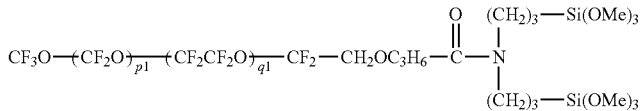
[Chem. 63]
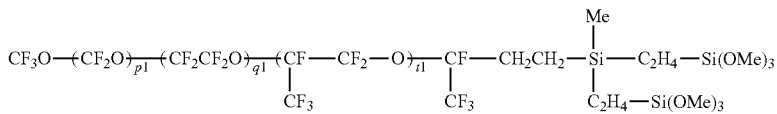
[Chem. 64]
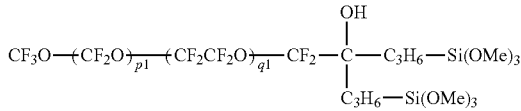
[Chem. 65]
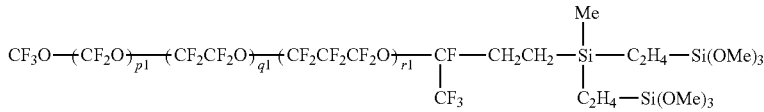
[Chem. 66]
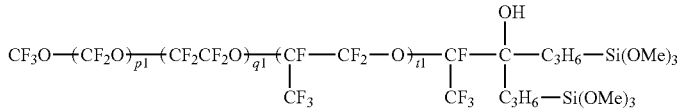
[Chem. 67]
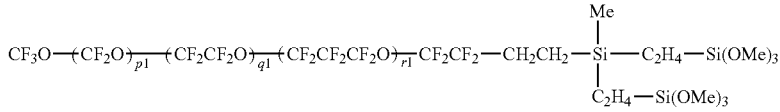
[Chem. 68]
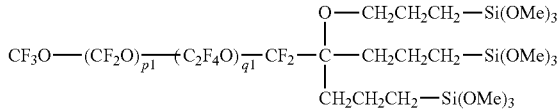
[Chem. 69]
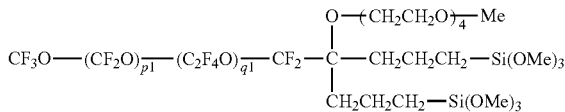
[Chem. 70]
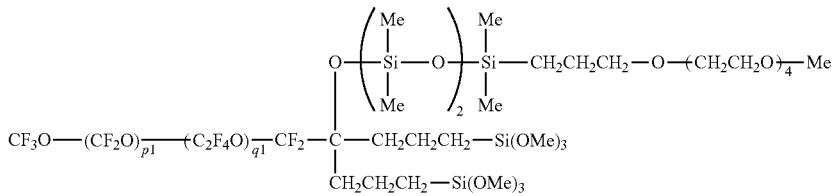
[Chem. 71]

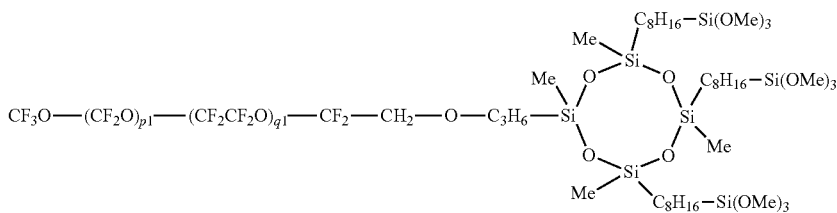
[Chem. 72]
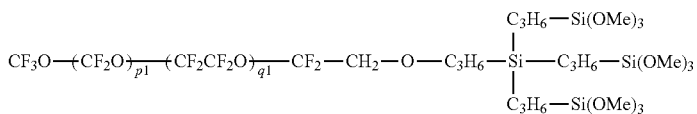
[Chem. 73]
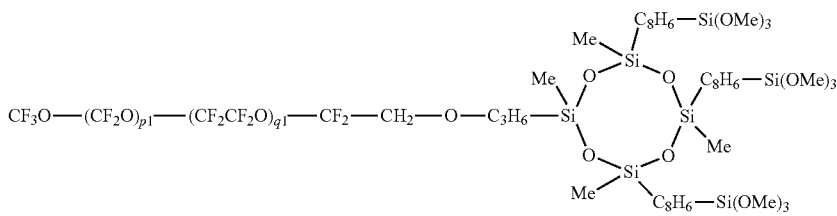
[Chem. 74]
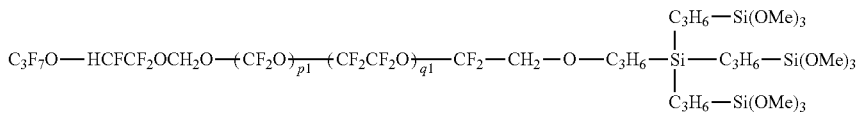
[Chem. 75]
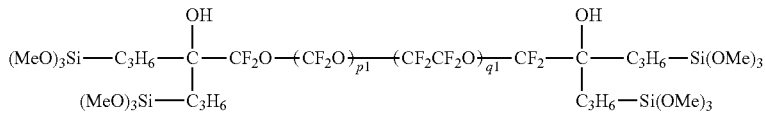
[Chem. 76]
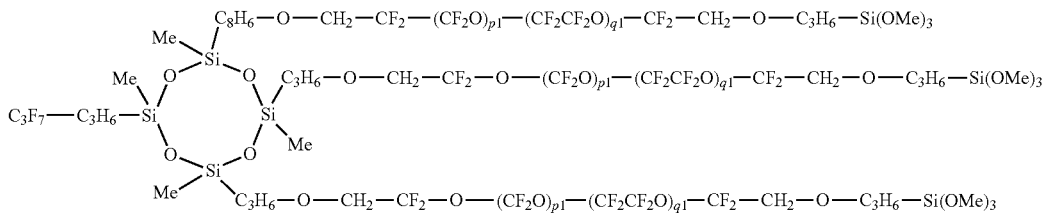
[Chem. 77]
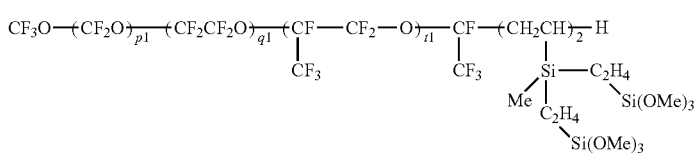
[Chem. 78]
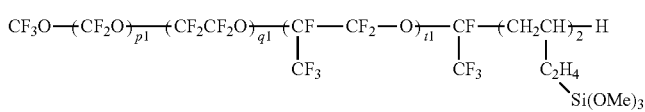
[Chem. 79]
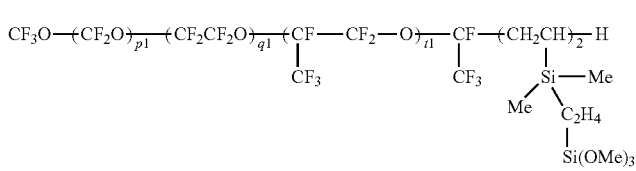
[Chem. 80]

-continued

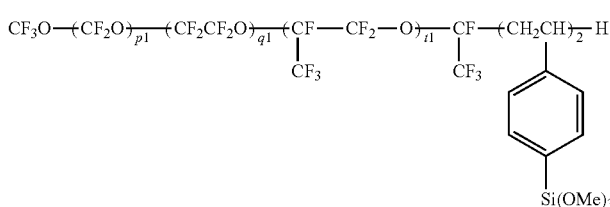

[Chem. 81]

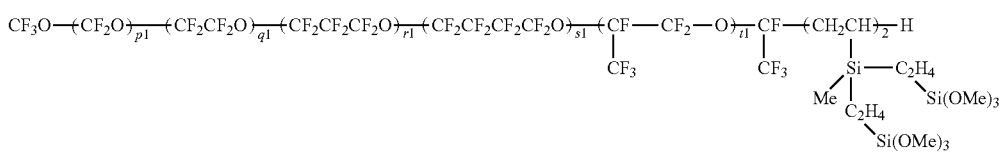

[Chem. 82]

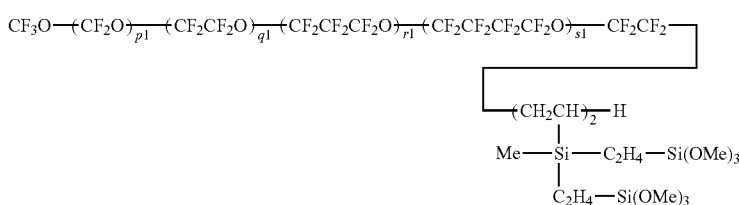

[Chem. 83]

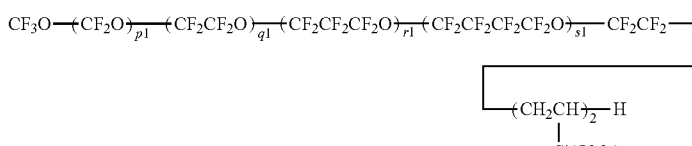

[Chem. 84]

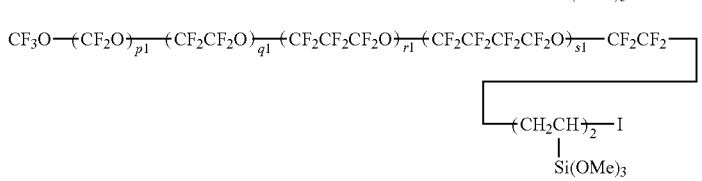

[Chem. 85]

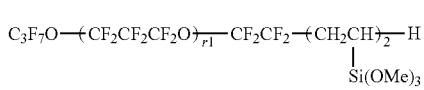

[Chem. 86]

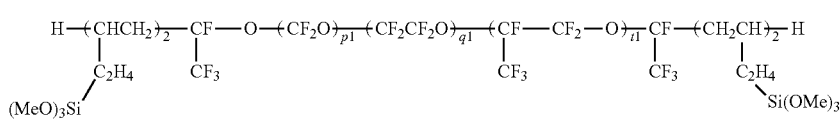

[Chem. 87]

Herein Me is methyl, p1, q1, r1, s1, and t1 are each independently an integer of 1 to 200, the sum of p1, q1, r1, s1, and t1 is 3 to 500, and the repeating units in parentheses with p1, q1, r1, s1, and t1 may be randomly arranged.

The fluorine-containing hydrolyzable organosilicon compounds (fluorinated hydrolyzable organosilicon compounds) having the general formulae (1) to (5) used herein may contain such compounds in which some or all of the hydrolyzable groups (X) are hydrolyzed (i.e., compounds in which X is OH group) and may further contain such compounds in which some or all of the OH groups are condensed.

Desirably the hydrolyzable fluorinated compound is previously diluted with a solvent. The solvent is not particularly limited as long as the hydrolyzable fluorinated compound is uniformly dissolved. Examples include fluorine-modified aliphatic hydrocarbon solvents such as perfluoroheptane and perfluorooctane; fluorine-modified aromatic hydrocarbon solvents such as 1,3-trifluoromethylbenzene; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, toluene, and xylene; and ketone solvents such as acetone, methyl ethyl ketone, and methyl isobutyl ketone. Of these, fluorine-modified solvents are preferred for solubility and stability, with fluorine-modified ether solvents and fluorine-modified aromatic hydrocarbon solvents being more preferred. The solvents may be used alone or in admixture of two or more.

The solvent is desirably contained such that the hydrolyzable fluorinated compound may account for 0.01 to 50% by weight, preferably 0.03 to 10% by weight, and more preferably 0.05 to 1% by weight of the water/oil repellent agent (i.e., solution containing the hydrolyzable fluorinated compound and the solvent).

The water/oil repellent agent containing the hydrolyzable fluorinated compound may be applied to the substrate by any well-known techniques such as wet coating (e.g., dipping, brush coating, spin coating, spraying, gravure coating, die coating, bar coating, and slit coating) and evaporation. Although coating and other conditions may accord with the prior art well-known process, it is efficient that the water/oil repellent agent containing the hydrolyzable fluorinated compound is applied by the wet coating process (wet process) because the primer layer is applied and formed by the wet coating process (wet process).

The hydrolyzable fluorinated compound may be cured at room temperature (25° C.) for 1 to 24 hours. Cure may be completed within a shorter time by heating at 30 to 200° C. for 1 minute to 1 hour. Cure under humid conditions (RH 50 to 90%) is preferred for accelerating hydrolysis.

It is noted that the surface of the primer layer on the substrate may be cleaned or activated by such treatment as plasma treatment, UV treatment or ozone treatment before the water/oil repellent agent containing the hydrolyzable fluorinated compound is coated thereon.

The fluorine layer (i.e., water/oil repellent layer) of the inventive water/oil repellent member should have a thickness of 0.5 to 30 nm, preferably 1 to 30 nm, and more preferably 8 to 25 nm. If the layer is too thick, the water/oil repellent layer may have a high surface resistivity on its outer surface. If the layer is too thin, surface properties and abrasion resistance may be insufficient.

In the inventive water/oil repellent member thus obtained, the water/oil repellent layer should have a surface resistivity of up to $1.0 \times 10^{11}$ Ω/sq, preferably $1.0 \times 10^{11}$ to $1.0 \times 10^7$ Ω/sq, and more preferably $9.8 \times 10^{10}$ to $1.0 \times 10^8$ Ω/sq on its outer surface. If the surface resistivity on the outer surface of the water/oil repellent layer is too high, electronic devices such as organic EL devices may malfunction and possible deposition of dust or debris causes a loss of surface visibility and detracts from optical properties and texture. In addition, the surface is readily fouled. As used herein, the surface resistivity may be measured by a commercial resistivity meter, for example, Hiresta-UX MCP-HT800 (Mitsubishi Chemical Analytech Co., Ltd.). In order that the outer surface of the water/oil repellent layer have a surface resistivity within the above range, it is necessary that the primer layer as a first layer which is composed mainly of an organosilicon compound having a plurality of silanol groups in the molecule have a thickness of 30 to 500 nm and the water/oil repellent layer as a second layer which is composed mainly of a cured product of a hydrolyzable fluorinated compound and formed on the outer surface of the primer layer have a thickness of 0.5 to 30 nm.

Examples of the water/oil repellent member include housings of car navigation systems, PC tablets, smartphones, digital cameras, digital video cameras, PDAs, portable audio players, car audio players, and game consoles; lenses such as camera lenses, eyeglass lenses, sunglasses, AR lenses, and VR lenses; medical instruments such as endoscopes, scalpels, blood pressure gauges, X-ray CT, and MRI; touch panel surfaces of liquid crystal displays, organic EL displays, and flexible devices; optical articles such as protective film, antireflective film, compact discs, DVDs, and Blu-ray disks; windowpanes, headlamp covers and headlight lenses of automobiles, trains, and aircraft; building exterior members, kitchen building members, waiting rooms, artistic objects, bodies and mirrors of transportation vehicles, and extremely high frequency sensor covers.

EXAMPLES

Examples and Comparative Examples are given below for further illustrating the invention although the invention is not limited thereto. In Examples, the thickness of the primer layer is determined by X-ray fluorescence film thickness measurement. Me stands for methyl.

Examples 1 to 8 and Comparative Examples 1 to 5

Test pieces of water/oil repellent members comprising a substrate, a primer layer, and a water/oil repellent layer were prepared by the following methods.
[Substrate]
A polycarbonate substrate (test piece substrate of 100 mm long×50 mm wide×2 mm thick, CARBOGLASS Polish from Engineering Test Service Co., Ltd.)
[Formation of Primer Layer]
The primer layer was formed on the substrate by the following method.
[Formation of Primer Layer 1]
A treatment solution was prepared by diluting a hydrolytic partial condensate of tetraethoxysilane (Mw: 25,000, silanol content: 0.015 mol/g) with butanol to a solid content of 0.5 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 1 of 19 nm thick on the outer surface of the substrate.
[Formation of Primer Layer 2]
A treatment solution was prepared by diluting a hydrolytic partial condensate of tetraethoxysilane (Mw: 25,000, silanol content: 0.015 mol/g) with butanol to a solid content of 0.78 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 2 of 30 nm thick on the outer surface of the substrate.
[Formation of Primer Layer 3]
A treatment solution was prepared by diluting a hydrolytic partial condensate of tetraethoxysilane (Mw: 25,000, silanol content: 0.015 mol/g) with butanol to a solid content of 0.98 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 3 of 42 nm thick on the outer surface of the substrate.
[Formation of Primer Layer 4]
A treatment solution was prepared by diluting a hydrolytic partial condensate of tetraethoxysilane (Mw: 25,000, silanol content: 0.015 mol/g) with butanol to a solid content of 1.5 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 4 of 58 nm thick on the outer surface of the substrate.
[Formation of Primer Layer 5]
A treatment solution was prepared by diluting a hydrolytic partial condensate of tetraethoxysilane (Mw: 25,000, silanol content: 0.015 mol/g) with butanol to a solid content of 2.0 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 5 of 91 nm thick on the outer surface of the substrate.

[Formation of Primer Layer 6]

A treatment solution was prepared by diluting a hydrolytic partial condensate of tetraethoxysilane (Mw: 25,000, silanol content: 0.015 mol/g) with butanol to a solid content of 3.0 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 6 of 148 nm thick on the outer surface of the substrate.

[Formation of Primer Layer 7]

A treatment solution was prepared by diluting a hydrolytic partial condensate of tetraethoxysilane (Mw: 25,000, silanol content: 0.015 mol/g) with butanol to a solid content of 4.0 wt %. The substrate was dip coated with the treatment solution (i.e., the substrate was dipped in the treatment solution for 60 seconds and then withdrawn at 150 mm/min), after which the coating was dried at room temperature (25° C.) for 1 hour, forming Primer layer 7 of 210 nm thick on the outer surface of the substrate.

[Formation of Primer Layer 8]

A treatment solution was prepared by diluting perhydropolysilazane with dibutyl ether to a solid content of 2.0 wt %. The substrate was dip coated with the treatment solution, after which the coating was cured at 80° C. and 80% RH for 24 hours, forming Primer layer 8 of 96 nm thick on the outer surface of the substrate. The dip coating included dipping the substrate in the treatment solution for 30 seconds and then withdrawing the substrate at 150 mm/min.

[Formation of Primer Layer 9]

A $SiO_2$ layer of 100 nm thick was deposited on the outer surface of the substrate by sputtering, forming Primer layer 9 of 100 nm thick on the outer surface of the substrate.

The water/oil repellent layer was formed and deposited by the following method on the outer surface of each of Primer layers 1 to 9 on the substrates.

[Formation of Water/Oil Repellent Layer]

After Compound 1 shown below was diluted with a fluorochemical solvent Novec 7200 (ethyl perfluorobutyl ether from 3M Company) to a solid content of 0.1 wt %, the dilution was spray coated onto the primer layer on the substrate using a spray coater NST-51 (T&K Co., Ltd.). The coating was cured at 80° C. for 30 minutes to form a cured coating (i.e., water/oil repellent layer), completing a test piece. The water/oil repellent layer had an average thickness of ~10 nm as computed from the F content detected by a X-ray fluorescence spectrometer ZSX mini2 (Rigaku Corp.).

[Compound 1]

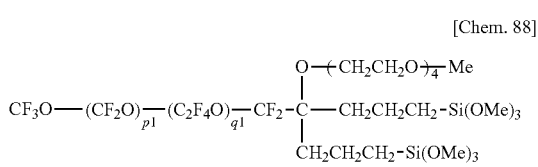

[Chem. 88]

Herein $p1+q1=45$ and $p1:q1=23:22$.

Examples 1, 2, 3, 4, 5, and 6 used substrates on which Primer layers 2, 3, 4, 5, 6, and 7 were formed, respectively. Comparative Examples 1, 2, and 3 used substrates on which Primer layers 1, 8, and 9 were formed, respectively. In Comparative Example 4, a water/oil repellent layer was directly formed on a polycarbonate resin substrate by the above method, without forming a primer layer. The resulting test pieces were evaluated by the following methods. The results are shown in Table 1.

[Antistatic Property]

For the evaluation of antistatic property, the surface resistivity was measured using a resistivity meter Hiresta-UX MCP-HT800 (Mitsubishi Chemical Analytech Co., Ltd.) under the following conditions.

Applied voltage: 1,000 V

[Water/Oil Repellency]

The contact angles with water and oleic acid of the cured coating (i.e., water/oil repellent layer) were measured using a contact angle meter Drop Master (Kyowa Interface Science Co., Ltd.).

[Coefficient of Dynamic Friction]

The coefficient of dynamic friction between the cured coating (i.e., water/oil repellent layer) and BEMCOT (Asahi Kasei Corp.) was measured using a surface property tester (Shinto Scientific Co., Ltd.) under the following conditions.

Contact area: 10 mm×30 mm

Load: 100 g

[Sebum Stain Wipe-Off]

Seven panelists transferred sebum from their forehead to the surfaces of the cured coatings (i.e., water/oil repellent layers) with the finger, wiped the coating surface with fabric BEMCOT (Asahi Kasei Corp.), and evaluated wipe-off according to the following criteria.

A: complete wipe-off within 2 strokes
B: complete wipe-off within 3 to 5 strokes
C: some residues after 5 stroke wipe-off
D: little wipe-off after 5 strokes

TABLE 1

| | Primer layer | Thickness of primer layer (nm) | Thickness of W/O repellent layer (nm) | Antistatic property, surface resistivity (Ω/sq) | Water/oil repellency Contact angle with water (°) | Contact angle with oleic acid (°) | Coefficient of dynamic friction | Sebum stain wipe-off |
|---|---|---|---|---|---|---|---|---|
| Comparative Example 1 | 1 | 19 | ~10 | $5.5 \times 10^{12}$ | 115 | 73 | 0.05 | A |
| Example 1 | 2 | 30 | ~10 | $9.8 \times 10^{10}$ | 114 | 75 | 0.05 | A |
| Example 2 | 3 | 42 | ~10 | $8.7 \times 10^{9}$ | 116 | 76 | 0.04 | A |
| Example 3 | 4 | 58 | ~10 | $3.4 \times 10^{9}$ | 116 | 76 | 0.05 | A |
| Example 4 | 5 | 91 | ~10 | $5.7 \times 10^{8}$ | 116 | 75 | 0.04 | A |
| Example 5 | 6 | 148 | ~10 | $5.6 \times 10^{8}$ | 116 | 74 | 0.04 | A |
| Example 6 | 7 | 210 | ~10 | $4.3 \times 10^{8}$ | 116 | 74 | 0.04 | A |
| Comparative Example 2 | 8 | 96 | ~10 | *1) | 117 | 76 | 0.07 | A |

TABLE 1-continued

|  | Primer layer | Thickness of primer layer (nm) | Thickness of W/O repellent layer (nm) | Antistatic property, surface resistivity (Ω/sq) | Water/oil repellency Contact angle with water (°) | Contact angle with oleic acid (°) | Coefficient of dynamic friction | Sebum stain wipe-off |
|---|---|---|---|---|---|---|---|---|
| Comparative Example 3 | 9 | 100 | ~10 | *1) | 116 | 74 | 0.06 | A |
| Comparative Example 4 | nil | 0 | ~10 | *1) | 110 | 67 | 0.12 | D |

*1) The surface resistivity was unmeasurably high.

It is apparent from the results in Table 1 that Examples 1 to 6 exhibited effective sebum stain wipe-off and least static buildup because the water/oil repellent layers had excellent water/oil repellency and a low surface resistivity at the outer surface. In Comparative Example 1 having the primer layer which was too thin in thickness, the water/oil repellent layer was not sufficiently reduced in surface resistivity on the outer surface, which was susceptible to static buildup. Comparative Example 2 using perhydropolysilazane which is typically in the wet coating of a silica film showed better surface properties (i.e., water/oil repellency) than Comparative Example 4, but the surface resistivity of the outer surface of the water/oil repellent layer was unmeasurably high. Comparative Example 3 using a sputtered $SiO_2$ film which is typical in the dry coating of a silica film showed better surface properties (i.e., water/oil repellency) than Comparative Example 4, but the surface resistivity of the outer surface of the water/oil repellent layer was unmeasurably high. Comparative Example 4 using no primer failed to exert the desired properties.

Silanol groups on the organosilicon compound used as the primer layer contribute to a reduction of surface resistivity by capturing air-borne moisture. The effect is not deprived even when fluoropolymer is grafted to the surface. Thus, the coating having both water/oil repellent and antistatic properties was formed.

Next, as in Examples, a thicker water/oil repellent layer was formed and deposited on the outer surface of Primer layer 5 on the substrate, and similarly evaluated. The results are shown in Table 2.

The water/oil repellent layers of 20 nm, 30 nm, and 50 nm thick were formed and deposited in Example 7, Example 8, and Comparative Example 5, respectively.

TABLE 2

|  | Primer layer | Thickness of primer layer (nm) | Thickness of W/O repellent layer (nm) | Antistatic property, surface resistivity (Ω/sq) | Water/oil repellency Contact angle with water (°) | Contact angle with oleic acid (°) | Coefficient of dynamic friction | Sebum stain wipe-off |
|---|---|---|---|---|---|---|---|---|
| Example 7 | 5 | 91 | 20 | $6.4 \times 10^8$ | 113 | 72 | 0.06 | A |
| Example 8 | 5 | 91 | 30 | $8.5 \times 10^9$ | 112 | 71 | 0.06 | A |
| Comparative Example 5 | 5 | 91 | 50 | $1.5 \times 10^{11}$ | 111 | 70 | 0.06 | A |

It is apparent from the results shown in Table 2 that as the water/oil repellent layer becomes thicker, the surface resistivity of the outer surface thereof increases as observed in Comparative Example 5. It is important for meeting both water/oil repellent and antistatic properties that the thickness of the water/oil repellent layer be thin enough to fall within the specific range.

INDUSTRIAL APPLICABILITY

The invention provides a water/oil repellent member comprising a cured coating (primer layer+water/oil repellent layer) having excellent water/oil repellent and antistatic properties. The coating can be formed only by the wet coating process and by the room temperature process. The invention enables coating over a large area. Thus, the water/oil repellent member is applicable to a functional film to be manufactured in roll form and ensures that electronic equipment casings and articles which are on daily use and in frequent contact maintain excellent antifouling surfaces for a long time.

The invention claimed is:

1. A water/oil repellent member comprising a substrate, a primer layer disposed as a first layer on at least one surface of the substrate, and a water/oil repellent layer disposed as a second layer on the outer surface of the primer layer, the primer layer being a layer which is composed mainly of an organosilicon compound having a plurality of silanol groups in the molecule and has a thickness of 30 to 500 nm, wherein the primer layer contains 50 to 100% by weight of the organosilicon compound having a plurality of silanol groups in the molecule which has a silanol content of 0.002 to 0.042 mol/g, the water/oil repellent layer being a layer which is composed mainly of a cured product of a hydrolyzable fluorinated compound and has a thickness of 0.5 to 30 nm, the water/oil repellent layer having a surface resistivity of up to $1.0 \times 10^{11}$ Ω/sq on its outer surface.

2. The water/oil repellent member of claim 1 wherein the organosilicon compound having a plurality of silanol groups in the molecule is a hydrolytic partial condensate of a tetraalkoxysilane.

3. The water/oil repellent member of claim 1 wherein the hydrolyzable fluorinated compound is a fluorooxyalkylene-containing hydrolyzable organosilicon compound which has at least one hydrolyzable silyl group at one or more molecular chain ends and a divalent linear perfluorooxyalkylene polymer residue composed of a linkage of multiple repeating units: —$C_jF_{2j}O$— wherein j is an integer of at least 1.

4. The water/oil repellent member of claim 3 wherein the hydrolyzable silyl group is a group selected from silyl groups containing a $C_1$-$C_{12}$ alkoxy, $C_2$-$C_{12}$ alkoxyalkoxy, $C_1$-$C_{10}$ acyloxy, $C_2$-$C_{10}$ alkenyloxy, halogen or amino moiety and silazane groups.

5. The water/oil repellent member of claim 3 wherein the divalent linear perfluorooxyalkylene polymer residue is a group having the formula:

—$(CF_2)_d$—O—$(CF_2O)_p(CF_2CF_2O)_q(CF_2CF_2CF_2O)_r$
$(CF_2CF_2CF_2CF_2O)_s(CF(CF_3)CF_2O)_t$—$(CF_2)_d$— wherein p, q, r, s, and t are each independently an integer of 0 to 200, p+q+r+s+t is 3 to 500, the repeating units in parentheses with subscripts p, q, r, s, and t may be randomly arranged, d is independently an integer of 0 to 8, and the unit with d may be straight or branched.

6. The water/oil repellent member of claim 1 wherein the hydrolyzable fluorinated compound is at least one compound selected from fluorine-containing hydrolyzable organosilicon compounds having the following general formulae (1) to (5):

$$(A-Rf)_\alpha ZW_\beta \quad (1)$$

$$Rf—(ZW_\beta)_2 \quad (2)$$

$$Z'—(Rf—ZW_\beta)_\gamma \quad (3)$$

wherein Rf is independently a divalent linear perfluorooxyalkylene polymer residue having the formula:

—$(CF_2)_d$—O—$(CF_2O)_p(CF_2CF_2O)_q(CF_2CF_2CF_2O)_r$
$(CF_2CF_2CF_2CF_2O)_s(CF(CF_3)CF_2O)_t$—$(CF_2)_d$— wherein p, q, r, s, and t are each independently an integer of 0 to 200, p+q+r+s+t is 3 to 500, the repeating units in parentheses with subscripts p, q, r, s, and t may be randomly arranged, d is independently an integer of 0 to 8, and the unit with d may be straight or branched, A is independently fluorine, hydrogen or a monovalent fluorine-containing group terminated with —$CF_3$, —$CF_2H$ or —$CH_2F$, Z and Z' are independently a single bond or di- to octavalent organic group which may contain nitrogen, oxygen, silicon, phosphorus or sulfur and may be fluorinated, W is independently a monovalent organic group terminated with a hydrolyzable group, α and β are each independently an integer of 1 to 7, α+β is an integer of 2 to 8, and γ is an integer of 2 to 8, $$A-Rf-Q-(Y)_\delta—B \quad (4)$$

$$Rf-(Q-(Y)_\delta—B)_2 \quad (5)$$

wherein Rf and A are as defined above, Q is independently a single bond or divalent organic group, δ is each independently an integer of 1 to 10, Y is independently a divalent organic group having a hydrolyzable group, and B is independently hydrogen, $C_1$-$C_4$ alkyl or halogen.

7. The water/oil repellent member of claim 6 wherein the fluorine-containing hydrolyzable organosilicon compound is selected from the following compounds:

[Chem. 1]
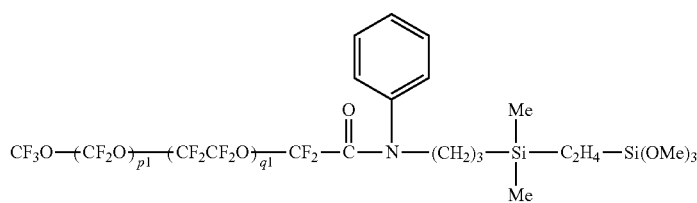

[Chem. 2]

[Chem. 3]
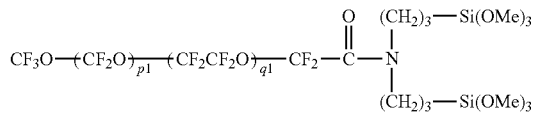

[Chem. 4]
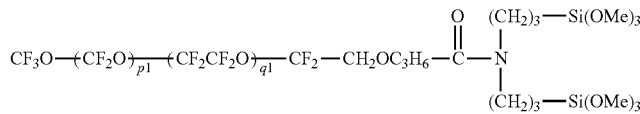

[Chem. 5]
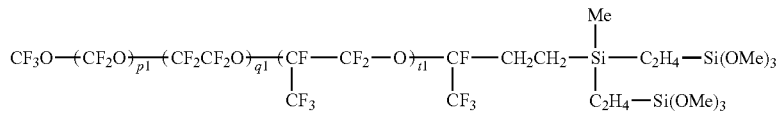

[Chem. 6]
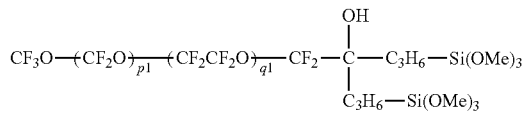

[Chem. 7]
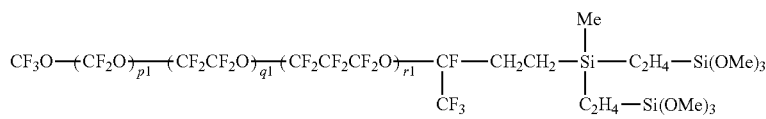
[Chem. 8]
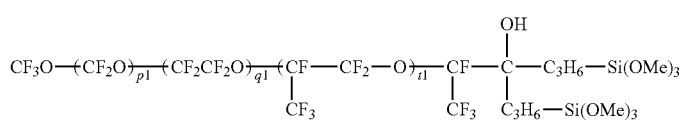
[Chem. 9]
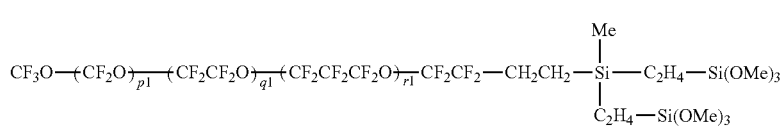
[Chem. 10]
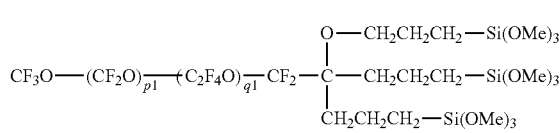
[Chem. 11]
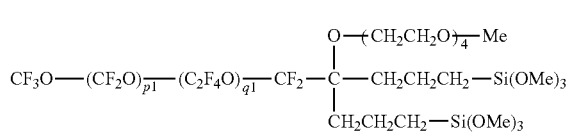
[Chem. 12]
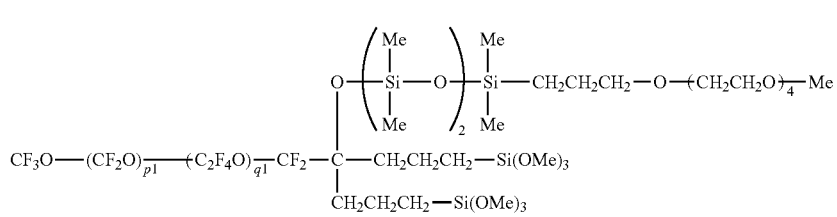
[Chem. 13]
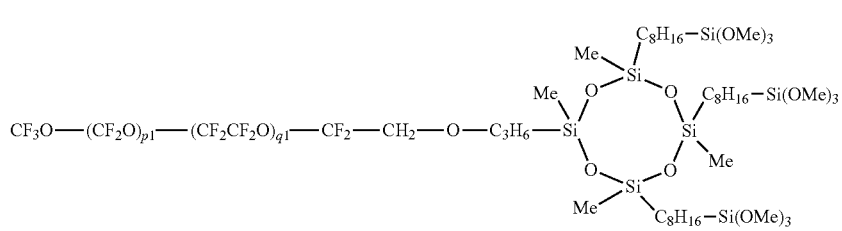
[Chem. 14]
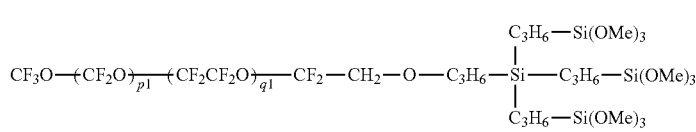
[Chem. 15]
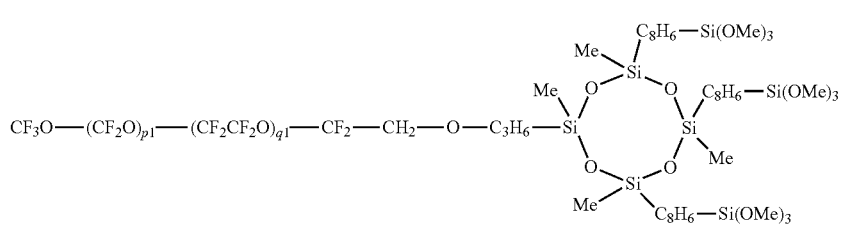
[Chem. 16]
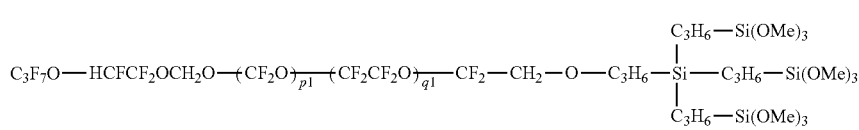

-continued
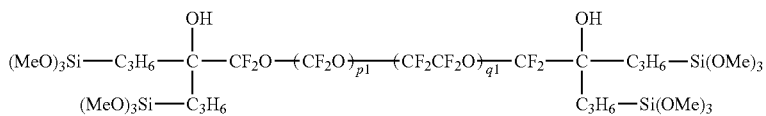
[Chem. 17]
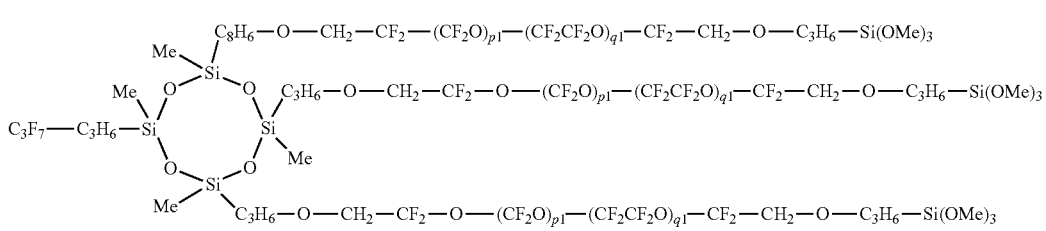
[Chem. 18]
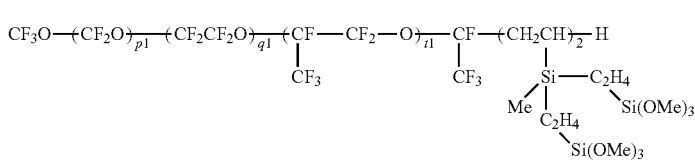
[Chem. 19]
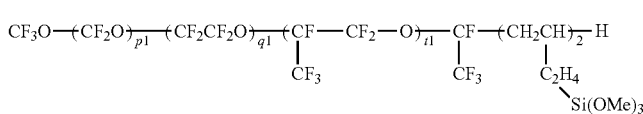
[Chem. 20]
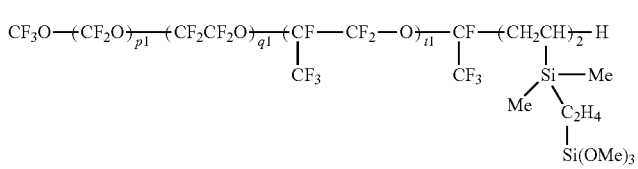
[Chem. 21]
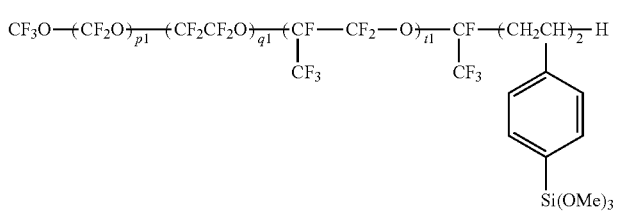
[Chem. 22]
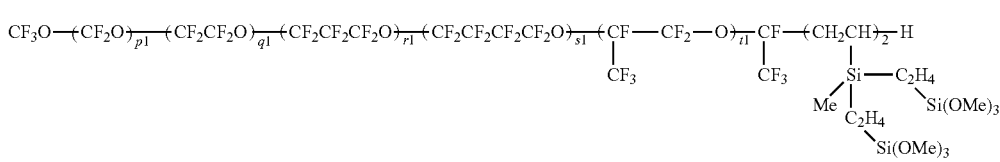
[Chem. 23]
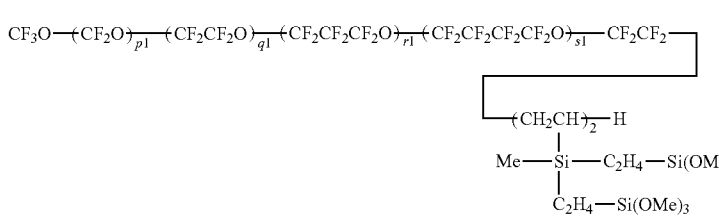
[Chem. 24]
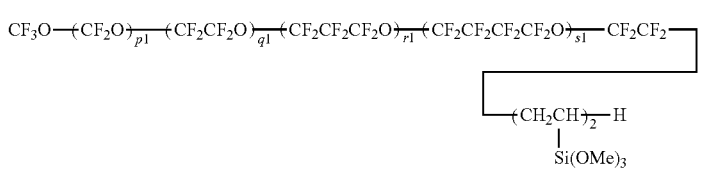
[Chem. 25]

-continued

[Chem. 26]
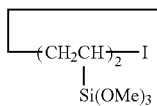

[Chem. 27]
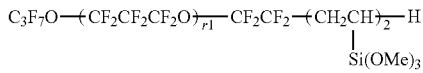

[Chem. 28]
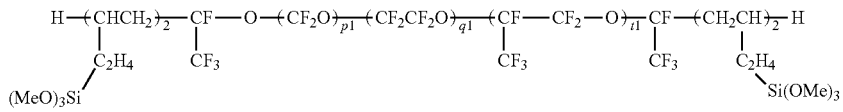

wherein Me is methyl, p1, q1, r1, s1, and t1 are each independently an integer of 1 to 200, the sum of p1, q1, r1, s1, and t1 is 3 to 500, and the repeating units in parentheses with subscripts p1, q1, r1, s1, and t1 may be randomly arranged.

8. The water/oil repellent member of claim 1 wherein the substrate is a resin, ceramic, quartz, glass, sapphire or diamond.

9. The water/oil repellent member of claim 1, wherein the organosilicon compound having a plurality of silanol groups in the molecule has a weight average molecular weight (Mw) of 300 to 100,000, wherein the Mw is measured by gel permeation chromatography (GPC) versus polystyrene standards using toluene as developing solvent.

10. The water/oil repellent member of claim 1, wherein the organosilicon compound having a plurality of silanol groups in the molecule has a silanol content of 0.004 to 0.042 mol/g.

11. A method for preparing the water/oil repellent member of claim 1, comprising the steps of wet coating a solution containing an organosilicon compound having a plurality of silanol groups in the molecule and a solvent on at least one surface of a substrate, drying the solvent to form and deposit a primer layer on the at least one surface of the substrate, wet coating a solution containing a hydrolyzable fluorinated compound and a solvent on the outer surface of the primer layer and then drying the solvent, or dry coating the hydrolyzable fluorinated compound obtained by evaporating the solvent from the solution, and curing the hydrolyzable fluorinated compound to form and deposit a water/oil repellent layer on the outer surface of the primer layer.

* * * * *